United States Patent
Rajaperumal et al.

(10) Patent No.: US 12,277,115 B2
(45) Date of Patent: *Apr. 15, 2025

(54) SHARING MATERIALIZED VIEWS IN MULTIPLE TENANT DATABASE SYSTEMS

(71) Applicant: Snowflake Inc., Bozeman, MT (US)

(72) Inventors: Prasanna Rajaperumal, Bangalore (IN); Thierry Cruanes, San Mateo, CA (US); Allison Waingold Lee, Pebble Beach, CA (US); Igor Demura, Mountain View, CA (US); Jiaqi Yan, Menlo Park, CA (US); Benoit Dageville, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,904

(22) Filed: Sep. 8, 2023

(65) Prior Publication Data
US 2023/0418818 A1    Dec. 28, 2023

Related U.S. Application Data

(63) Continuation of application No. 16/831,000, filed on Mar. 26, 2020, now Pat. No. 11,914,591, which is a
(Continued)

(51) Int. Cl.
*G06F 16/00* (2019.01)
*G06F 7/00* (2006.01)
*G06F 16/2453* (2019.01)

(52) U.S. Cl.
CPC .............. *G06F 16/24539* (2019.01)

(58) Field of Classification Search
CPC .................................................. G06F 16/24539
(Continued)

(56) References Cited

U.S. PATENT DOCUMENTS 6,125,360 A * 9/2000 Witkowski ............ G06F 16/217
707/999.102
6,134,543 A    10/2000 Witkowski et al.
(Continued)

FOREIGN PATENT DOCUMENTS

CN    105144159    12/2015
CN    113490928    10/2021
(Continued)

OTHER PUBLICATIONS

Lorentz, D. Oracle Database SQL Reference, 10g Release 2 (10.2). (2005). pp. 999-1214. (Year: 2005).*
(Continued)

*Primary Examiner* — Raquel Perez-Arroyo
(74) *Attorney, Agent, or Firm* — Schwegman Lundberg & Woessner, P.A.

(57) ABSTRACT

Systems, methods, and devices for sharing materialized views in multiple tenant database systems. A method includes defining a materialized view over a source table that is associated with a first account of a multiple tenant database. The method includes defining cross-account access rights to the materialized view to a second account such that that second account can read the materialized view without copying the materialized view. The method includes modifying the source table for the materialized view. The method includes identifying whether the materialized view is stale with respect to the source table by merging the materialized view and the source table.

18 Claims, 16 Drawing Sheets

Related U.S. Application Data continuation of application No. 16/428,395, filed on May 31, 2019, now abandoned.

(58) Field of Classification Search
USPC .......................................................... 707/717
See application file for complete search history.

(56) References Cited

U.S. PATENT DOCUMENTS

| | | | |
|---|---|---|---|
| 6,882,993 | B1 | 4/2005 | Lawande et al. |
| 11,914,591 | B2 | 2/2024 | Rajaperumal et al. |
| 2004/0122828 | A1 | 6/2004 | Sidle et al. |
| 2004/0225666 | A1* | 11/2004 | Hinshaw .............. G06F 16/2393 |
| 2006/0288035 | A1 | 12/2006 | Viavant |
| 2007/0073657 | A1* | 3/2007 | Santosuosso ..... G06F 16/24539 |
| 2009/0018991 | A1 | 1/2009 | Thiyagarajan et al. |
| 2009/0019005 | A1 | 1/2009 | Hu et al. |
| 2009/0037489 | A1 | 2/2009 | Grundler et al. |
| 2009/0064160 | A1 | 3/2009 | Larson et al. |
| 2012/0173581 | A1 | 7/2012 | Hartig et al. |
| 2012/0254214 | A1* | 10/2012 | Lauer .................. G06F 16/2471 |
| | | | 707/E17.014 |
| 2014/0074558 | A1 | 3/2014 | Jain et al. |
| 2014/0280028 | A1 | 9/2014 | Ding et al. |
| 2014/0280029 | A1* | 9/2014 | Ding ................. G06F 16/24539 |
| | | | 707/717 |
| 2014/0310232 | A1 | 10/2014 | Plattner et al. |
| 2015/0161560 | A1 | 6/2015 | Burckart et al. |
| 2016/0275150 | A1* | 9/2016 | Bournonnais ........... G06F 16/25 |
| 2016/0292443 | A1 | 10/2016 | Von Muhlen et al. |
| 2018/0196955 | A1 | 7/2018 | Dageville et al. |
| 2019/0179941 | A1 | 6/2019 | Williams et al. |
| 2020/0110748 | A1* | 4/2020 | Watzke ................. G06F 16/284 |
| 2020/0379994 | A1 | 12/2020 | Rajaperumal et al. |
| 2020/0379995 | A1 | 12/2020 | Rajaperumal et al. |

FOREIGN PATENT DOCUMENTS

| | | |
|---|---|---|
| WO | 2016175880 | 11/2016 |
| WO | 2020243184 | 12/2020 |

OTHER PUBLICATIONS

"U.S. Appl. No. 16/428,395, Preliminary Amendment filed Mar. 26, 2020", 14 pgs.
"U.S. Appl. No. 16/831,000, Non Final Office Action mailed Jun. 12, 2020", 23 pgs.
"U.S. Appl. No. 16/831,000, Examiner Interview Summary mailed Jul. 28, 2020", 3 pgs.
"International Application Serial No. PCT US2020 034719, International Search Report mailed Aug. 12, 2020", 2 pgs.
"International Application Serial No. PCT US2020 034719, Written Opinion mailed Aug. 12, 2020", 4 pgs.
"U.S. Appl. No. 16/831,000, Response filed Aug. 14, 2020 to Non Final Office Action mailed Jun. 12, 2020", 10 pgs.
"U.S. Appl. No. 16/428,395, Non Final Office Action mailed Dec. 7, 2020", 16 pgs.
"Basic Advanced Materialized Views", Database Data Warehousing Guide, Oracle 11.2, (2013), 1-52.
"Privileges, Roles, and Security Policies", Oracle9i Database Concepts, Oracle 9.2, (2002), 1-20.
"Knox. Secure Views", Effective Oracle Database 10g Security by Design, (2013), 1-8.
"U.S. Appl. No. 16/831,000, Final Office Action mailed Dec. 7, 2020", 30 pgs.
"U.S. Appl. No. 16/428,395, Response filed Mar. 8, 2021 to Non Final Office Action mailed Dec. 7, 2020", 16 pgs.
"U.S. Appl. No. 16/831,000, Response filed Mar. 8, 2021 to Final Office Action mailed Dec. 7, 2020", 10 pgs.
"U.S. Appl. No. 16/428,395, Examiner Interview Summary mailed Mar. 11, 2021", 2 pgs.
"U.S. Appl. No. 16/428,395, Final Office Action mailed Apr. 6, 2021", 17 pgs.
"U.S. Appl. No. 16/428,395, Response filed May 28, 2021 to Final Office Action mailed Apr. 6, 2021", 16 pgs.
"U.S. Appl. No. 16/831,000, Non Final Office Action mailed Jun. 24, 2021", 32 pgs.
"U.S. Appl. No. 16/428,395, Non Final Office Action mailed Aug. 3, 2021", 16 pgs.
"Chinese Application Serial No. 202080007285.5, Notification to Make Rectification mailed Jul. 20, 2021", with English translation, 2 pages.
"U.S. Appl. No. 16/831,000, Response filed Sep. 24, 2021 to Non Final Office Action mailed Jun. 24, 2021", 10 pgs.
"U.S. Appl. No. 16/428,395, Response filed Nov. 30, 2021 to Non Final Office Action mailed Aug. 3, 2021", 16 pgs.
"International Application Serial No. PCT US2020 034719, International Preliminary Report on Patentability mailed Dec. 9, 2021", 6 pgs.
"U.S. Appl. No. 16/831,000, Non Final Office Action mailed Jan. 6, 2022", 41 pgs.
"U.S. Appl. No. 16/428,395, Final Office Action mailed Jan. 25, 2022", 18 pgs.
"U.S. Appl. No. 16/831,000, Response filed Apr. 6, 2022 to Non Final Office Action mailed Jan. 6, 2022", 11 pgs.
"Indian Application Serial No. 202147054684, First Examination Report mailed Apr. 20, 2022", with English translation, 6 pages.
"U.S. Appl. No. 16/428,395, Response filed Apr. 25, 2022 to Final Office Action mailed Jan. 25, 2022", 17 pgs.
"European Application Serial No. 20814542.5, Response filed Jun. 30, 2022 to Communication pursuant to Rules 161 and 162 mailed Mar. 10, 2022", 21 pgs.
"U.S. Appl. No. 16/428,395, Non Final Office Action mailed Jul. 19, 2022", 21 pgs.
"U.S. Appl. No. 16/831,000, Final Office Action mailed Aug. 3, 2022", 44 pgs.
"U.S. Appl. No. 16/428,395, Response filed Oct. 19, 2022 to Non Final Office Action mailed Jul. 19, 2022", 17 pgs.
"U.S. Appl. No. 16/831,000, Response filed Nov. 3, 2022 to Final Office Action mailed Aug. 3, 2022", 12 pgs.
"U.S. Appl. No. 16/831,000, Non Final Office Action mailed Nov. 25, 2022", 36 pgs.
"Indian Application Serial No. 202147054684, Resonse filed Nov. 19, 2022 to First Examination Report mailed Apr. 20, 2022", with English translation, 35 pages.
"U.S. Appl. No. 16/428,395, Final Office Action mailed Dec. 21, 2022", 18 pgs.
"European Application Serial No. 20814542.5, Extended European Search Report mailed Jan. 2, 2023", 8 pgs.
"U.S. Appl. No. 16/831,000, Response filed Feb. 27, 2023 to Non Final Office Action mailed Nov. 25, 2022", 13 pgs.
"U.S. Appl. No. 16/428,395, Response filed Apr. 20, 2023 to Final Office Action mailed Dec. 21, 2022", 14 pgs.
"U.S. Appl. No. 16/831,000, Notice of Allowance mailed Jun. 8, 2023", 16 pgs.
"U.S. Appl. No. 16/428,395, Non Final Office Action mailed Jul. 12, 2023", 20 pgs.
"European Application Serial No. 20814542.5, Response filed Jul. 28, 2023 to Extended European Search Report mailed Jan. 2, 2023", 10 pgs.
"U.S. Appl. No. 16/428,395, Response filed Jan. 10, 2024 to Non Final Office Action mailed Jul. 12, 2023", 16 pgs.
"U.S. Appl. No. 16/428,395, Final Office Action mailed Mar. 7, 2024", 18 pgs.
"Chinese Application Serial No. 202080007285.5, Office Action mailed Jun. 5, 2024", With English Translation, 25 pgs.
Galindo-Legaria, "Database Change Notifications: Primitives for Efficient Database Query Result Caching", VLDB Conference, (2005), 1275-1278.
Sebaa, "Materialized View Maintenance: Issues, Classification, and Open Challenges", International Journal of Cooperative Information Systems, 28:1; 1-59, (Mar. 2019), 59 pgs.
U.S. Appl. No. 16/428,395, filed May 31, 2019, Sharing Materialized Views in Multiple Tenant Database Systems.

(56) References Cited

OTHER PUBLICATIONS

U.S. Appl. No. 16/831,000, U.S. Pat. No. 11,914,591, filed Mar. 26, 2020, Sharing Materialized Views in Multiple Tenant Database Systems.
"Chinese Application Serial No. 202080007285.5, Office Action mailed Nov. 15, 2024", w/ English translation, 26 pgs.
"Chinese Application Serial No. 202080007285.5, Response filed Dec. 31, 2024 to Office Action mailed Nov. 15, 2024", w/ current English claims, 24 pgs.
"Chinese Application Serial No. 202080007285.5, Response filed Sep. 27, 2024 to Office Action mailed Jun. 5, 2024", with English claims, 23 pages.

* cited by examiner

1800

Defining A Share Object In A First Account, The Share Object Comprising Data Associated With The First Account.
1802

Granting Cross-Account Access Rights To The Share Object To A Second Account Such That The Second Account Has Access To The Share Object Without Copying The Share Object.
1804

Generating A Materialized View Over The Share Object.
1806

Updating The Data Associated With The First Account.
1808

Identifying Whether The Materialized View Is Stale With Respect To The Share Object By Merging The Materialized View And The Share Object.
1810

FIG. 18

SHARING MATERIALIZED VIEWS IN MULTIPLE TENANT DATABASE SYSTEMS

CROSS-REFERENCE TO RELATED APPLICATIONS

This application is a Continuation of U.S. patent application Ser. No. 16/831,000, filed Mar. 26, 2020, which is a Continuation of U.S. patent application Ser. No. 16/428,395, filed on May 31, 2019, the contents of which are incorporated herein in their entireties.

TECHNICAL FIELD

The present disclosure relates to databases and more particularly relates to data sharing and materialized views in database systems.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In some instances, different organizations, persons, or companies may wish to share database data. For example, an organization may have valuable information stored in a database that could be marketed or sold to third parties. The organization may wish to enable third parties to view the data, search the data, and/or run reports on the data. In traditional methods, data is shared by copying the data in a storage resource that is accessible to the third party. This enables the third party to read, search, and run reports on the data. However, copying data is time and resource intensive and can consume significant storage resources. Additionally, when the original data is updated by the owner of the data, those modifications will not be propagated to the copied data.

In light of the foregoing, disclosed herein are systems, methods, and devices for instantaneous and zero-copy data sharing in a multiple tenant database system. The systems, methods, and devices disclosed herein provide means for querying shared data, generating and refreshing materialized views over shared data, and sharing materialized views.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 18 is a schematic flow chart diagram of a method for cross-account generation and refreshing of a materialized view in a multiple tenant database system according to one embodiment;

DETAILED DESCRIPTION

Figure 1:
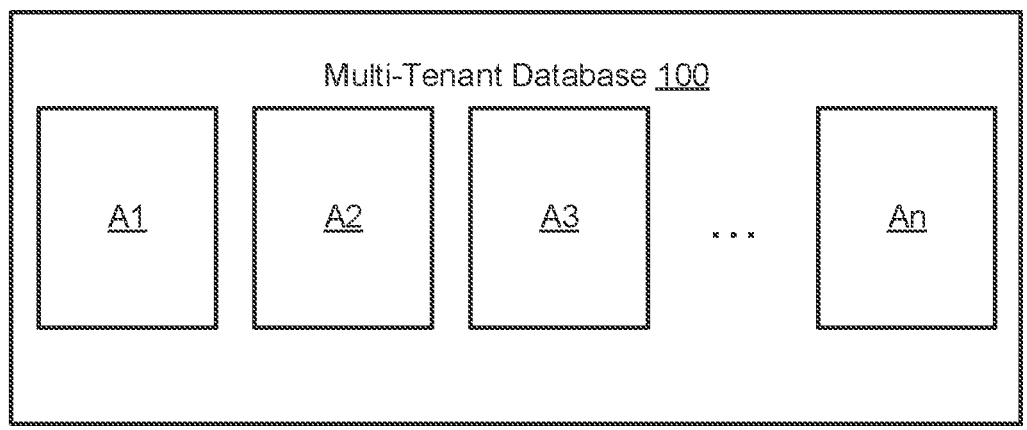
FIG. 1 is a schematic block diagram illustrating accounts in a multiple tenant database, according to one embodiment.

Disclosed herein are systems, methods, and devices for cross-account generation of materialized views in a multiple tenant database system, and further for cross-account sharing of materialized views. A database system may have multiple accounts or clients that each store unique sets of data within the database system. In an example implementation, the database system may store and manage data for multiple businesses and each of the multiple businesses may have its own account within the database system. In some instances, it may be desirable to permit two or more different accounts to share data. Data may be shared between a provider account that owns the data and shares the data with a receiver account. The data may be more valuable to the receiver account if the receiver account can query the data to generate reports based on the data or analyze the data. If the receiver account frequently runs the same query on the data, the receiver account may wish to generate a materialized view for that query. The materialized view enables the receiver account to quickly generate query results on the data without reading or processing all of the data each time the same query is run.

In light of the foregoing, the systems, methods, and devices disclosed herein enable data sharing between accounts of a multiple tenant database system. The systems, methods, and devices disclosed herein further enable the cross-account generation and refreshing of materialized views over shared data. The systems, methods, and devices disclosed herein further enable the cross-account sharing and refreshing of materialized views such that a limited scope of data may be shared between account.

In an example implementation of the present disclosure, one account of a multiple tenant database could be associated with a retail store that sells goods that are provided by a manufacturer. The manufacturer and the retail store may each have their own account within the multiple tenant database system. The retail store could store data about which items and how many items have been sold that were supplied by the manufacturer. The retail store may store additional data such as where the items were sold, for what price the items were sold, whether the items were purchased online or in a retail store, demographics for which persons purchased the items, and so forth. The data stored by the retail store may have significant value for the manufacturer. The retail store and the manufacturer could enter into an agreement so that the manufacturer can access data about its items that have been sold by the retail store. In this example implementation, the retail store is the provider account because the retail store owns the sales data for the items. The manufacturer is the receiver account because the toy manufacturer will view the data that is owned by the retail store. The retail store's data is stored within the multiple tenant database system. The retail store provides cross-account access rights to the manufacture that allows the manufacturer to read the data about sales of the manufacturer's items. The retail store may restrict the manufacturer from viewing any other data such as employee data, sales data for other items, and so forth. The manufacturer can view and query the data owned by the retail store that has been made available to the manufacturer. The manufacturer can generate a materialized view over the data. The materialized view stores query results so the manufacturer can more quickly query the data. The materialized view can be automatically refreshed to reflect any updates that have been made to its source table (i.e. the table owned by the retail store). The manufacturer may make multiple materialized views for multiple different queries that are commonly requested by the manufacturer. The materialized views may be privately generated by the manufacturer such that the retail store has no visibility into which materialized views have been generated by the manufacturer.

In a further implementation of the disclosure, and further to the same example scenario presented above, the retail store may wish to share summary information with the manufacturer without permitting the manufacturer to view all information stored in the retail store's account of the multiple tenant database. In such an implementation, the retail store may generate a materialized view and share only the materialized view with the manufacturer. In the example scenario, the retail store might generate a materialized view that indicates how many different items are offered for sale by the retail store that have been produced by the manufacturer, how many items have been sold over a certain time period that were produced by the manufacturer, an average price of the items sold by the retail store that were produced by the manufacturer, and so forth. It should be appreciated that the materialized view may provide any pertinent summary information depending on the needs of the database clients. In the example implementation, the retail store may share only the materialized view with the manufacturer so the manufacturer can view the summary information but cannot view the underlying data, schema, metadata, data organization structure, and so forth. In the example implementation, the retail store may cause the materialized view to be automatically refreshed when the source table for the materialized view has been modified or updated.

The systems, methods, and devices disclosed herein provide improved means for sharing data, sharing materialized views, generating materialized views over shared data, and automatically updating materialized views over shared data. Such systems, methods, and devices as disclosed herein provide significant benefits to database clients wishing to share data and/or read data owned by another party.

A materialized view is a database object that stores the results of a query. The materialized view is generated based on a source table that supplies the results for the query. A materialized view may be stored locally in a cache resource of an execution node so that it can be quickly accessed when processing the query. Materialized views are typically generated for performance reasons so that query results can be obtained faster and can be computed using fewer processing resources. Materialized views can be cached as a concrete table rather than a view so that the materialized view can be updated to reflect any changes made to the source table. The source table can be modified by way of insert, delete, update, and/or merge commands, and these modifications can cause the materialized view to be stale with respect to the source table. The materialized view is "stale" with respect to its source table when there have been changes made to the data in the source table, but those changes have not yet been propagated to the materialized view. When the materialized view is stale with respect to the source table, the materialized view can no longer be solely relied upon to determine accurate query results. Embodiments disclosed herein provide improved means for generating, storing, and refreshing materialized views such that queries can be executed over materialized views even if the materialized view is stale with respect to its source table.

An embodiment of the disclosure enables cross-account data sharing using secure views. A view may be defined as a secure view when it is specifically designated for data privacy or to limit access to data that should not be exposed to all accounts of the underlying table. Data might be exposed in a secure view when, for example, an account has access to only a subset of data. Secure views permit a database account to expose a restricted data set to other accounts or users without the possibility of the underlying, unrestricted data being exposed to those other accounts or users. In an embodiment, a provider account can authorize cross-account access to its data to a receiver account. The provider account may limit the receiver account to viewing only certain data and may restrict the receiver account from viewing any underlying organization schema or statistics about the data.

In an embodiment, a secure view provides several security guarantees when compared against a regular view. In an embodiment, the secure view does not expose the view definition to non-owners of the view. This impacts various operations that access the data dictionary. In an embodiment, the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In an embodiment, the secure view does not expose data from tables accessed by the view which is filtered out by the view. In such an embodiment, a client account associated with a non-secure view may access data that would be filtered out by taking advantage of query optimizations that may cause user expressions to be evaluated before security expressions (e.g. filters and joints). In such an embodiment, to achieve this requirement, the set of query optimizations that can be applied to a query containing a secure view may be restricted to guarantee that the user expressions that can leak data are not evaluated before the view is filtered.

In an embodiment, data in the multiple tenant database system is stored across a plurality of shared storage devices. The data may be stored in tables and the data in a single table may further be partitioned or separated into multiple immutable storage devices referred to herein as a micro-partition. Micro-partitions are immutable storage devices that cannot be updated in-place and must be regenerated when the data stored therein is modified. An analogy to the micro-partitions of the table may be different storage buildings within a storage compound. In the analogy, the storage compound is similar to the table, and each separate storage building is similar to a micro-partition. Hundreds of thousands of items are stored throughout the storage compound. Because so many items are located at the storage compound, it is necessary to organize the items across the multiple separate storage buildings. The items may be organized across the multiple separate storage buildings by any means that makes sense. For example, one storage building may store clothing, another storage building may store household goods, another storage building may store toys, and so forth. Each storage building may be labeled so that the items are easier to find. For example, if a person wants to find a stuffed bear, the person will know to go to the storage building that stores toys. The storage building that stores toys may further be organized into rows of shelving. The toy storage building may be organized so that all stuffed animals are located on one row of shelving. Therefore, the person looking for the stuffed bear may know to visit the building that stores toys and may know to visit the row that stores stuffed animals. Further to the analogy with database technology, each row of shelving in the storage building of the storage compound may be similar to a column of database data within a micro-partition of the table. The labels for each storage building and for each row of shelving are similar to metadata in a database context.

When a transaction is executed on a table, all impacted micro-partitions in the table are recreated to generate new micro-partitions that reflect the modifications made by the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for updating table metadata after one or more changes (transactions) have occurred on the table.

The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Multiple tenant databases or multiple tenant data warehouse support multiple distinct customer accounts at once. As an example, FIG. 1 is a schematic block diagram illustrating a multiple tenant database or data warehouse that supports many different customer accounts A1, A2, A3, An, etc. Customer accounts may be separated by multiple security controls, including different uniform resource locators (URLs) to connect to different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multiple tenant data warehouses or database system.

In some cases, it may be desirable to allow cross-account data sharing and/or the cross-account generation and updating of materialized views. However, no current multiple tenant database system allows sharing of data between different customer accounts in an instantaneous, zero-copy, easy-controllable fashion.

Based on the foregoing, disclosed herein are systems, methods, and devices that, in one embodiment, may be implemented for generating, updating, and/or viewing a materialized view over shared data. The systems, methods, and devices disclosed herein further provide means for sharing materialized views. The data can be shared such that it is instantly accessible with no need to copy the data. The materialized view may be accessible to multiple parties without copying the materialized view. Some embodiments provide access to data using fine-grained controls to maintain separation of desired data while allowing access to data that a customer wishes to share.

Embodiments disclosed herein provide systems, methods, and devices for sharing a "share object" or "database object" between a provider account and one or more other accounts in a database system. The provider account shares the share object or database object with the one or more other "receiver" accounts. The provider account may enable one or more receiver accounts to view and/or generate a materialized view over the provider's data. In one embodiment, the share object or database object may include database data such as data stored in a table of the database that is owned by the provider account. The share object or database object may include metadata about database data such as minimum/maximum values for a table or micro-partition of a database, underlying structural or architectural details of the database data, and so forth. The share object may include a listing of all other accounts that may receive cross-account access rights to elements of the share object. The listing may indicate, for example, that a second account may use procedural logic of the share object without seeing any underlying code defining the procedural logic. The listing may further indicate, for example, that a third account may use database data of one or more tables without seeing any structural information or metadata about the database data. The listing may indicate any combination of usage privileges for elements of the share object, including whether secondary accounts may see metadata or structural information for database data or procedural logic. The listing may indicate whether a receiver account has rights to generate or update a materialized view over the provider's database data.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Referring now to the figures, FIG. 1 is a schematic block diagram illustrating a multiple tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multiple tenant data warehouses or database system.

Figure 2:
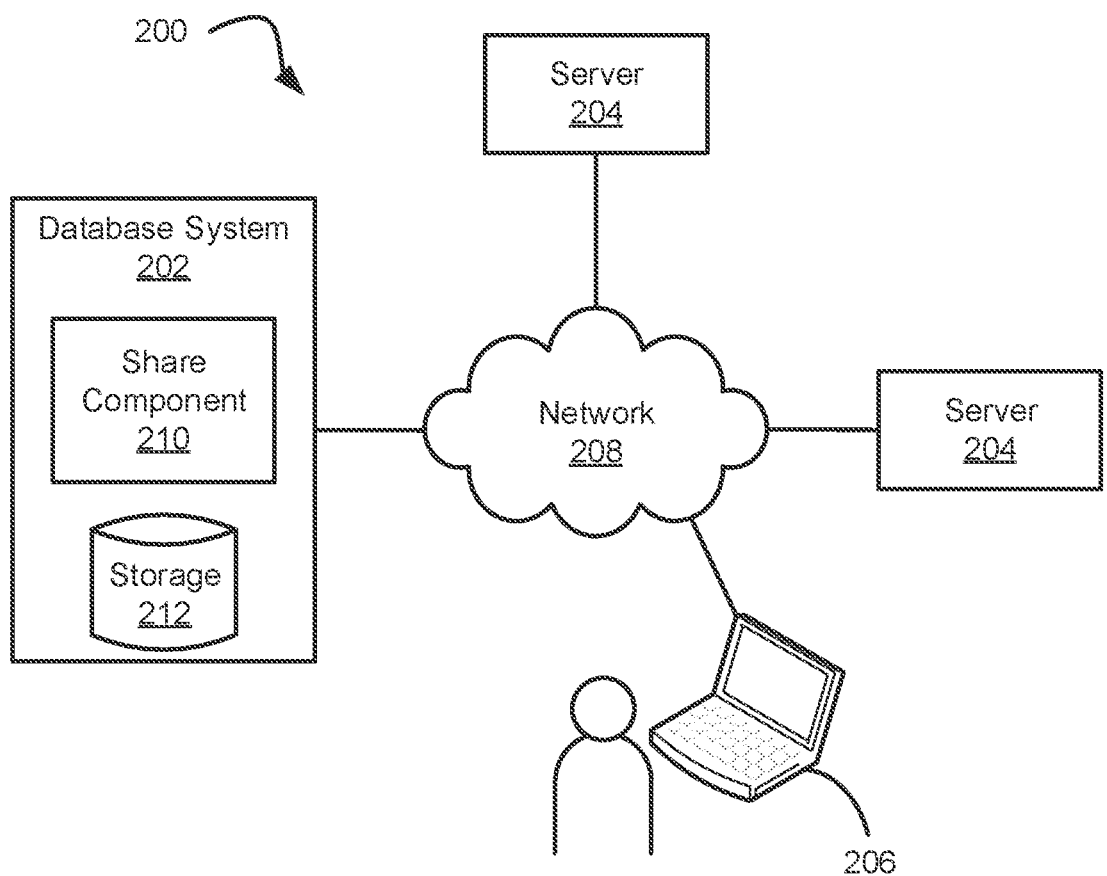
FIG. 2 is a schematic diagram illustrating a system for providing and accessing database services, according to one embodiment.

FIG. 2 is a schematic diagram of a system 200 for providing and accessing database data or services. The system 200 includes a database system 202, one or more servers 204, and a client computing system 206. The database system 202, the one or more servers 204, and/or the client computing system 206 may communicate with each other over a network 208, such as the Internet. For example, the one or more servers 204, and/or the client computing system 206 may access the database system 202 over the network 208 to query a database and/or receive data from a database. The data from the database may be used by the one or more servers 204 or client computing system 206 for any type of computing application. In one embodiment, the database system 202 is a multiple tenant database system hosting data for a plurality of different accounts.

The database system 202 includes a share component 210 and storage 212. The storage 212 may include storage media for storing data. For example, the storage 212 may include one or more storage devices for storing database tables, schemas, encryption keys, data files, or any other data. The share component 210 may include hardware and/or software for enabling the cross-account sharing of data or services and/or for associating view privileges with data or services. For example, the share component 210 may enable cross-account generation and updating of materialized views over shared data. The share component 210 may define a secure view of database data such that two or more accounts may determine common datapoints without revealing the datapoints themselves or any other datapoints that are not common between the accounts. Further for example, the share component 210 may process queries/instructions received from remote devices to access shared data or share data. The queries/instructions may be received from the one or more servers 204 or the client computing system 206. In one embodiment, the share component 210 is configured to allow sharing data between accounts without creating duplicate copies of tables, data, or the like outside the sharing account. For example, the share component may allow for computer resources allocated to a sharing account to perform any queries or instructions provided by a foreign account.

In one embodiment, storage and compute resources for the multiple tenant database 100 are logically and/or physically separated. In one embodiment, storage is a common, shared resource across all accounts. Compute resources may be set up independently, per account, as virtual warehouses. In one embodiment, a virtual warehouse is a set of compute nodes that access data in a storage layer and compute a query result. Separating the compute nodes or resources from the storage allows scaling each layer independently. Separation of storage and compute also allows that shared data can be processed independently by different accounts, without the computation in one account affecting the computation in other accounts. That is, in at least some embodiments, there is no contention among computing resources when running queries on shared data.

Figure 3:
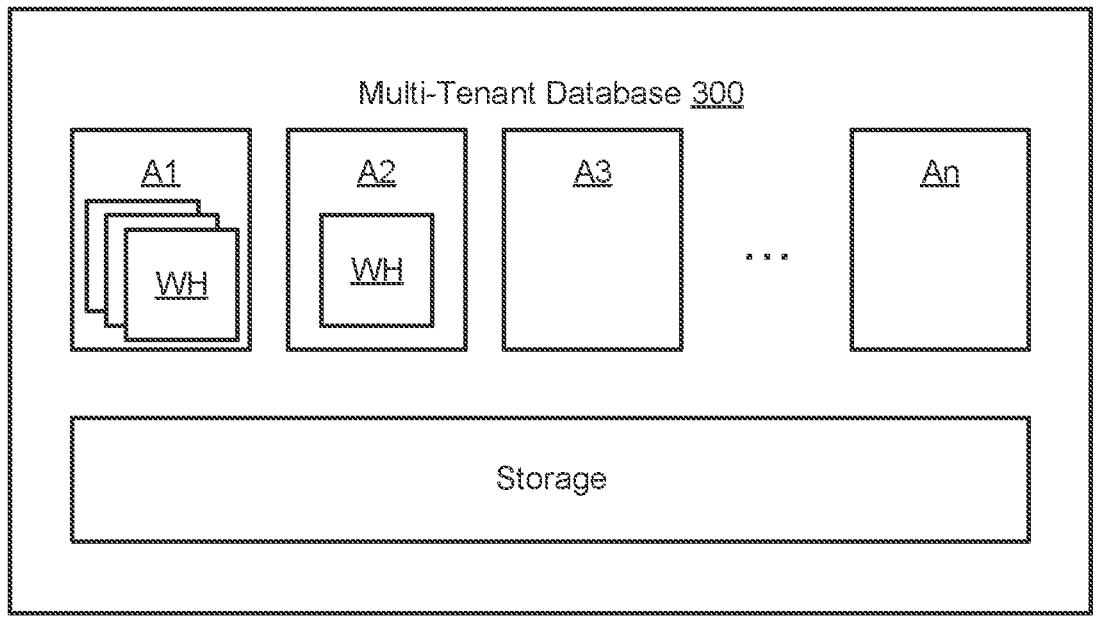
FIG. 3 is a schematic diagram illustrating a multiple tenant database with separation of storage and computing resources, according to one embodiment.

FIG. 3 is a schematic block diagram of a multiple tenant database 300 illustrating separation of storage and computing resources. For example, the multiple tenant database 300 may be a data warehouse where a plurality of different accounts (A1, A2, A3, through An) are hosted. In FIG. 3, account A1 has three virtual warehouses running, account A2 has one virtual warehouse running, and account A3 has no virtual warehouse running. In one embodiment, all these virtual warehouses have access to the storage layer that is separated from the compute nodes of the virtual warehouses. In one embodiment, virtual warehouses can be dynamically provisioned or removed based on a current workload for an account.

In one embodiment, a multiple tenant database system 300 uses object hierarchies in accounts. For example, each customer account may contain object hierarchies. Object hierarchies are often rooted in databases. For example, databases may contain schemas and schemas, in turn, may contain objects such as tables, views, sequences, file formats, and functions. Each of these objects serves a special purpose: tables store relational or semi-structured data; views define logical abstractions over the stored data; sequences provide means to generate ever-increasing numbers; file formats define ways to parse ingested data files; and functions hold user-defined execution procedures. In embodiments as disclosed herein, views may be associated with secure user-defined function definitions such that underlying data associated with the view is hidden from non-owner accounts who have access to the view.

Figure 4:
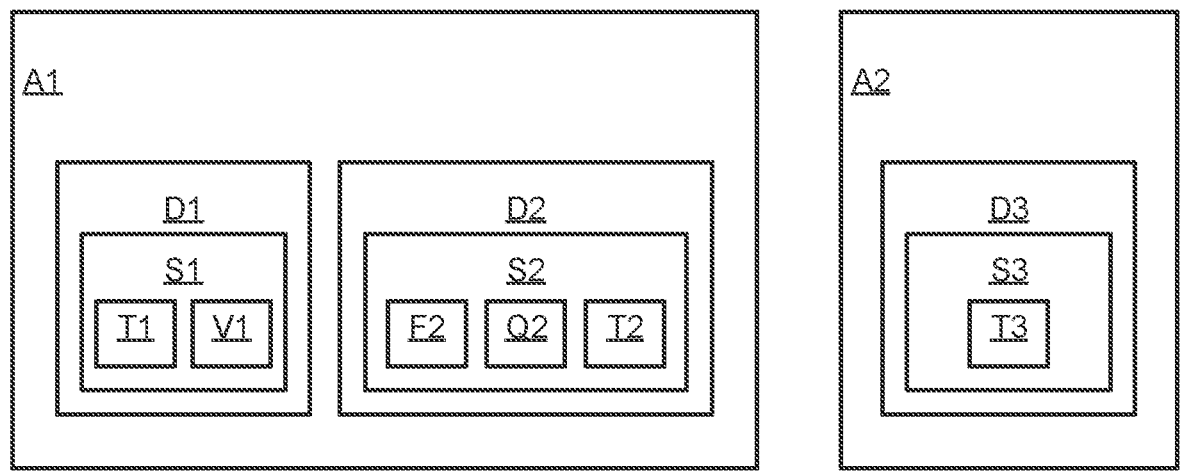
FIG. 4 is a schematic block diagram illustrating object hierarchies, according to one embodiment.

FIG. 4 is a schematic block diagram illustrating object hierarchies within customer accounts. Specifically, accounts may include hierarchies of objects which may be referenced in a database. For example, customer account A1 contains two databases objects D1 and D2. Database object D1 contains schema object S1, which in turn contains table object T1 and view object V1. Database object D2 contains schema object S2, which contains function object F2, sequence object Q2, and table object T2. Customer account A2 contains a database object D3 with schema object S3 and table object T3. The object hierarchies may control how objects, data, functions, or other information or services of an account or database system are accessed or referenced.

In one embodiment, a database system implements role-based access control to govern access to objects in customer accounts. In general, role-based access control consists of two basic principles: roles and grants. In one embodiment, roles are special objects in a customer account that are assigned to users. Grants between roles and database objects define what privileges a role has on these objects. For example, a role that has a usage grant on a database can "see" this database when executing the command "show databases"; a role that has a select grant on a table can read from this table but not write to the table. The role would need to have a modify grant on the table to be able to write to it.

Figure 5:
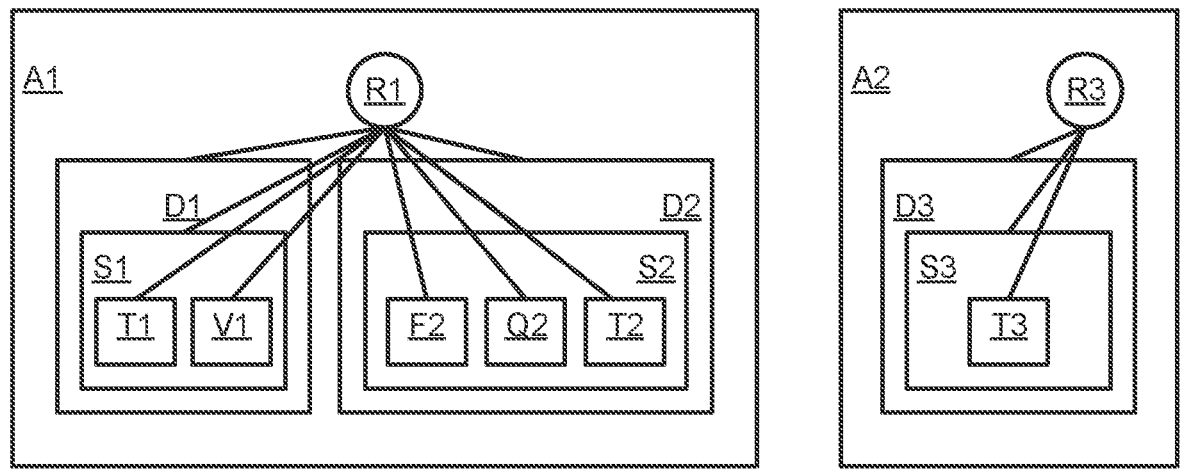
FIG. 5 is a schematic diagram illustrating role-based access, according to one embodiment.

FIG. 5 is a schematic block diagram illustrating role-based access to objects in customer accounts. A customer account A1 contains role R1, which has grants to all objects in the object hierarchy. Assuming these grants are usage grants between R1 and D1, D2, S1, S2 and select grants between R1 and T1, V1, F2, Q2, T2, a user with activated role R1 can see all objects and read data from all tables, views, and sequences and can execute function F2 within account A1. Customer account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

Figure 6:
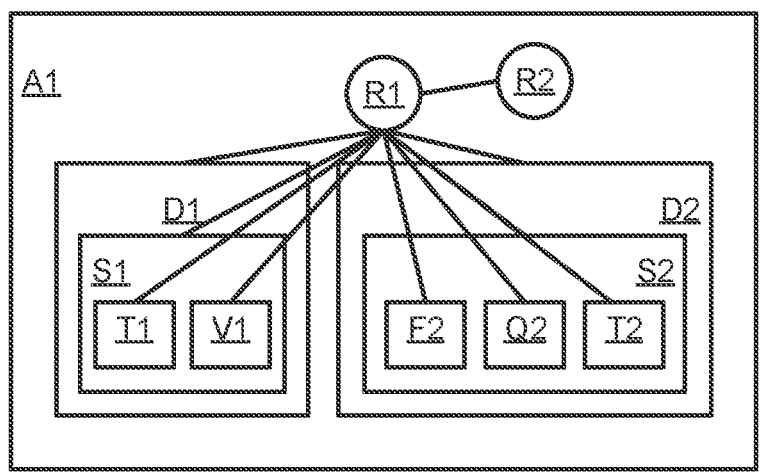
FIG. 6 is a schematic diagram illustrating a usage grant between roles, according to one embodiment.

FIG. 6 illustrates a usage grant between roles. With role-based access control, it is also possible to grant usage from one role to another role. A role that has a usage grant to another role "inherits" all access privileges of the other role. For example, in role R2 has a usage grant on role R1. A user (e.g., with corresponding authorization details) with activated role R2 can see and read from all objects because role R2 inherits all grants from role R1.

Figure 7:
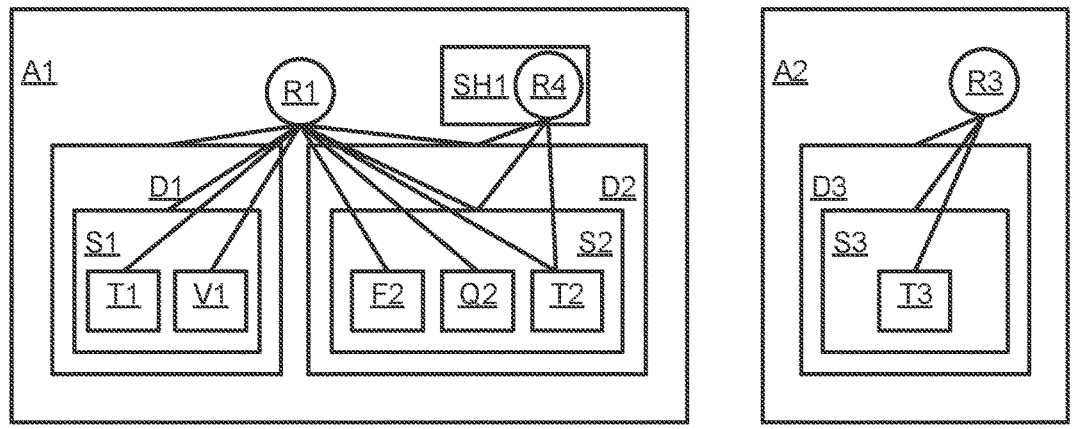
FIG. 7 is a schematic diagram illustrating a share object, according to one embodiment.

FIG. 7 is a schematic block diagram illustrating a share object SH1. In an embodiment, the share object is a column of data across one or more tables and cross-account access rights are granted to the share object such that one or more other accounts may generate, view, and/or update a materialized view over data in the share object. Customer account A1 contains share object SH1. Share object SH1 has a unique name "SH1" in customer account A1. Share object SH1 contains role R4 with grants to database D2, schema S2, and table T2. The grants on database D2 and schema S2 may be usage grants and the grant on table T2 may be a select grant. In this case, table T2 in schema S2 in database D2 would be shared read-only. Share object SH1 contains a list of references to other customer accounts, including account A2.

After the share object is created, the share object may be imported or referenced by a receiver account listed in the share object. For example, importing a share object from a provider account is possible from other customer accounts. A receiver account may run a command to list all available share objects for importing. Only if a share object was created with references that included the receiver account, the receiver account may list the share object and subsequently import it. In one embodiment, references to a share object in another account are always qualified by account name. For example, receiver account A2 would reference share SH1 in provider account A1 with the example qualified name "A1.SH1".

In one embodiment, processing or importing a share object may include: creating an alias object in the receiver account; linking the alias object with the top-most shared object in the provider account in the object hierarchy; granting a role in the receiver account usage privileges to the alias object; and granting the receiver account role usage privileges to the role contained in the share object.

In one embodiment, a receiver account that imports the share object or data creates an alias object. An alias object is similar to a normal object in a customer account. An alias object has its own unique name with which it is identified. An alias object may be linked to the top-most object in each object hierarchy that is shared. If multiple object hierarchies are shared, multiple alias objects may be created in the receiver account. Whenever an alias object is used (e.g., reading from the alias object, writing to the alias object), the alias object is internally replaced by the normal object in the provider account to which it links. This way, alias objects are merely proxy objects of normal objects, and not duplicate objects. Thus, when reading from or writing to an alias object, the operations affect the original object that the alias links to. Like normal objects, when an alias object is created it is granted to the activated role of the user.

In addition to the alias object, a grant between a role in the receiver account and the role contained in the share object is created. This is a usage grant from role to role across customer accounts. Role-based access control now allows a user in the receiver account to access objects in the provider account.

Figure 8:
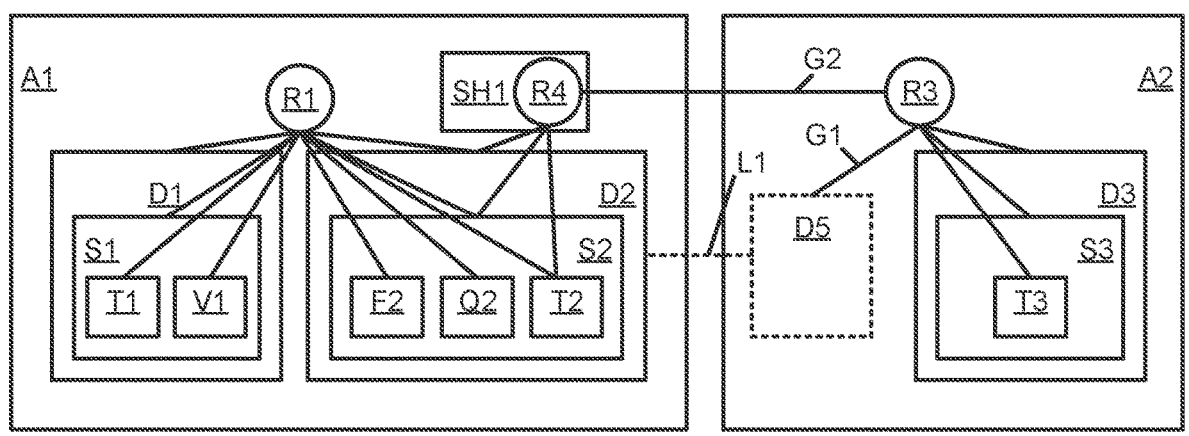
FIG. 8 is a schematic diagram illustrating cross-account grants, according to one embodiment.

FIG. 8 is a schematic block diagram illustrating logical grants and links between different accounts. A database alias object D5 is created in account A2. Database alias D5 references database D2 via link L1. Role R3 has a usage grant G1 on database D5. Role R3 has a second usage grant G2 to role R4 in customer account A1. Grant G2 is a cross-account grant between accounts A1 and A2. In one embodiment, role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2".

Using object aliases and cross-account grants from a role in the receiver account to a role in the provider account allows users in the receiver account to access information in the provider account. In this way, a database system may enable sharing of data between different customer accounts in an instantaneous, zero-copy, easy-controllable fashion. The sharing can be instantaneous because alias objects and cross-account grants can be created in milliseconds. The sharing can be zero-copy because no data must be duplicated in the process. For example, all queries, or selections can be made directly to the shared object in the provider account without creating a duplicate in the receiver account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a provider account and a second virtual warehouse for a second account, or the provider account, may process a database query or statement using the shared data of the provider account.

Figure 9:
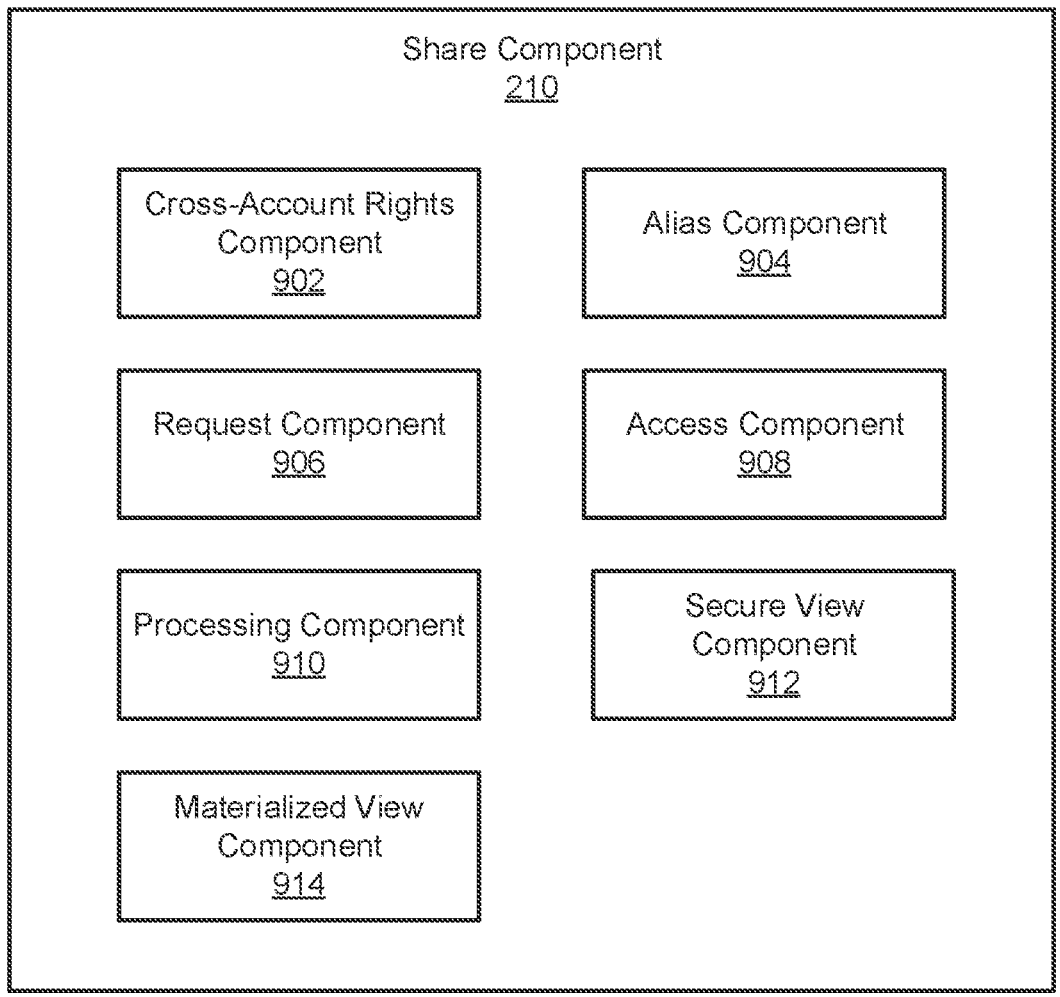
FIG. 9 is a schematic block diagram illustrating components of a share component, according to one embodiment.

FIG. 9 is a schematic block diagram of a share component 210. The share component 210 includes a cross-account rights component 902, an alias component 904, a request component 906, an access component 908, a processing component 910, a secure view component 912, and a materialized view component 914. The components 902-914 are given by way of example only and may not all be included in all embodiments. For example, each of the components 902-914 may be included in or may be implemented as part of a separate device or system.

The cross-account rights component 902 is configured to create and manage rights or grants between accounts. The cross-account rights component 902 may generate a share object in a provider account. For example, a user of the provider account may provide input indicating that one or more resources should be shared with another account. In one embodiment, the user may select an option to create a new share object so that resources can be shared with foreign accounts. In response to the user input, the cross-account rights component 902 may create a share object in the provider account. The share object may include a role to which access rights can be granted to resources for sharing with a foreign account. The foreign account may include a customer account or other account that is separate from the provider account. For example, the foreign account may be another account hosted on a multiple tenant database system.

Upon creation, the share object may be granted rights to one or more resources within the provider account. The resources may include a database, a schema, a table, a sequence, or a function of the provider account. For example, the share object may contain a role (i.e., share role) which is granted right to read, select, query, or modify a data storage object, such as a database. The share object, or share role in the share object, may be granted rights similar to how rights may be granted to other roles using role-based access control. A user may be able to access an account and grant rights to the share role so that the share role can access resources that are meant to be shared with foreign accounts. In one embodiment, the share object may include a list of objects, and an access level, for which the share role has rights.

The share object may also be made available or linked to specific foreign accounts. For example, the share object may store a list of accounts that have rights to the share role or share object in the provider account. A user with the provider account may add or remove accounts to the list of accounts. For example, the user may be able to modify the list to control which accounts can access objects shared via the share object. Foreign accounts listed or identified in the share object may be given access to resources with access rights granted to a share role of the share object. In one embodiment, a specific account can perform a search to identify share objects or provider accounts that have been shared with the specific account. A list of available share objects can be viewed by a user of the receiver or specific account.

The alias component 904 is configured to generate an alias for data or a data object shared by a separate account. For example, the alias object may create, in a receiver account, an alias object corresponding to a shared resource shared by a provider account. In one embodiment, the alias object is created in response to a receiver account accepting a shared resource or trying to access a shared resource for the first time. The alias object may act as an alias for a data object for the highest object hierarchy shared by the provider account (see, e.g., FIG. 8 where D5 is an alias for D2). The alias component 904 may also generate a link between the alias object and a shared object (see, e.g., FIG. 8 where L1 is the link between D5 and D2). The link may be created and/or stored in the form of an identifier or name of the original or "real" object. For example, the link L1 in FIG. 8 may include an identifier for D2 stored in the alias object D5 that includes a unique system wide name, such as "A1.D2".

The alias component 904 may also grant a role in the receiver account (the account with which the provider account has shared data or resources) access rights to the alias object (see, e.g., G1 of FIG. 8). Additionally, the alias component 904 may also grant the role in the receiver account to a share role in the share object of the provider account (see, e.g., G2 of FIG. 8). With the alias object created, a link between the alias object and an object in the provider account, and grants to a role in the receiver account, the receiver account may be free to run queries, statements, or "see" shared data or resources in the provider account.

The request component 906 is configured to receive a request from an account to access a shared resource in a different account. The request may include a database query, select statement, or the like to access a resource. In one embodiment, the request includes a request directed to an alias object of the requesting account. The request component 906 may identify a resource with which the alias object is linked, such as a database or table in a provider account. The request component 906 may identify the linked object based on an identifier of the alias object.

The request component 906 may further be configured to receive a request from an account to count common datapoints between two accounts. The request component 906 may be associated with a first account and may receive a request from a second account to generate a secure join between the two accounts and determine how many, and which, datapoints are shared between the two accounts. The datapoints may be of a single subject matter or column identifier or may be of multiple subject matters.

The access component 908 is configured to determine whether an account has access to a shared resource of a different account. For example, if a first account requests access to a resource of a different, second account, the access component 908 may determine whether the second account has granted access to the first account. The access component 908 may determine whether a requesting account has access by determining whether a share object identifies the requesting account. For example, the access component 908 may check if the requesting account is present in a list of accounts stored by a share object. The access component 908 may also check whether the share object that identifies the requesting account has access rights (e.g., grants) to the receiver data resource in the provider account.

In one embodiment, the access component 908 may check for the presence of a grant from a share role in a provider account to a requesting role in the requesting account. The access component 908 may check whether a link exists between an alias object to which a database request or statement was directed or whether a grant exists between a requesting role and the alias object. For example, the access component 908 may check for the existence or presence of one or more of L1, G1 and G2 illustrated in FIG. 8. Furthermore, the access component 908 may check for a grant between a role in a share object to an object (such as a table or database) of the provider account. For example, the access component 908 may check for the existence of a grant between the role R4 and the database D2 in FIG. 8. If the access component 908 determines that the requesting account has access to the shared resource, the request may be fulfilled by the share component 210 or a processing component 910. If the access component 908 determines that the requesting account does not have rights to the requested data or object, the request will be denied.

The processing component 910 is configured to process database requests, queries, or statements. The processing component 910 may process and provide a response to a request from an account to access or use data or services in another account. In one embodiment, the processing component 910 provides a response to a request by processing the request using original data in a provider account that is different from the requesting account. For example, the request may be directed toward a database or table stored in or for a first account and the processing component 910 may process the request using the database or table of the first account and return a response to a requesting, second account.

In one embodiment, the processing component 910 performs processing of shared data without creating a duplicate table or other data source in the requesting account. Generally, data must be first ingested into an account that wishes to process that data or perform operations against the data. The processing component 910 may save processing time, delay, and/or memory resources by allowing a receiver account to access shared resources in a provider account without creating a copy of a data resource in the receiver account.

The processing component 910 may perform processing of the same data using different processing resources for different accounts. For example, a first virtual warehouse for a first account may process a database query or statement using data shared by a provider account and a second virtual warehouse for a second account, or the provider account, may process a database query or statement using the shared data of the provider account. Using separate processing resources to process the same data may prevent contention for processing resources between accounts. The processing resources may include dynamically provisioned processing resources. In one embodiment, processing of shared data is performed using a virtual warehouse for the requesting account even though the data may be in storage for a different account.

The secure view component 912 is configured to define a secure view for a share object, a data field of a share object, a data field of a database object, and so forth. In an embodiment, the secure view component 912 defines the secure view using a SECURE keyword in a view field and may set or unset the SECURE property on a view using an ALTER VIEW command. In various embodiments, the secure view component 912 may implement such commands only at the manual direction of a client account or may be configured to automatically implement such commands. The secure view component 912 may alter the parser to support the secure keyword before the view name and the new alter view rule. In an embodiment, the alter view rule may be more general to incorporate further view-level attributes. In terms of metadata support, the vies may effectively be stored as tables, and the change may involve altering a table data persistence object that includes a secure flag indicating whether the view is a secure view (this may be implemented in addition to the view text comprising the secure tag). The secure user-defined function definition (i.e. the table data persistence object) may be hidden from users that are not the owner of the view. In such an embodiment, a command to show views will return results as usual to the owner of the view but will not return the secure user-defined function definition to a non-owner second account that has access to the view.

The secure view component 912 may alter transformations of a parse tree, e.g. view merging and predicate information. The canonical implementation may include annotating query blocks such that the query blocks are designated as coming from secure view. In such an implementation, the query blocks cannot be combined with external query blocks (e.g. view merging) or expressions (e.g. via filter pushdown).

The secure view component 912 may rewrite the query plan tree during optimization e.g. during filter pullup and/or filter pushdown. The secure view component 912 may be configured to ensure that no expression that does not stem from a secure view can be pushed down below the view boundaries. The secure view component 912 may be configured to achieve this by implementing a new type of projection that behaves identically to a standard projection but, since it is not a standard projection, fails to match any of the rewrite rule preconditions. As a result, the relevant rewrites are not applied. The secure view component 912 may be configured to identify what type of projection is to be generated (e.g. a standard projection or a secure projection) after query blocks have been designated as coming from a secure user-defined function definition or not.

The secure view component 912 is configured to optimize performance for secure views in a zero-copy data sharing system. In various embodiments known in the art, secure views are known to cause a loss of performance that may effectively cripple the optimizer from applying certain transformations. Such embodiments might be improved by deeming certain transformations as safe, where safety indicates that the operations being transformed will not have any side effects on the system. Such side effects may be caused by a user defined function (UDF) that performs operations that cannot readily identify unsafe operations, or operations that can fail and reveal information about the data value that caused the failure (e.g. when dividing by zero or some similar operation). The secure view component 912 may annotate expressions with the expression's safety properties and then enable transformations that allow an expression to be pushed through a secure view boundary if the expression is deemed safe. The expression may be deemed safe if the expression is known to produce no errors and the expression does not contain a user defined function (UDF). The secure view component 912 may determine whether the expression produces errors by utilizing an expression properties framework where the expression properties store an indication whether an expression may produce errors.

The materialized view component 914 is configured to generate and/or update a materialized view over shared data. The materialized view component 914 is further configured to share a materialized view that may have a secure view definition. The materialized view component 914 may be integrated in execution resources allocated to the provider account and/or the receiver account. In an embodiment, the provider account authorizes a receiver account to view the provider account's data. The provider account may give the receiver account unlimited access to view the provider account's data or the provider account may grant the receiver account authorization to view its data with a secure view definition. The secure view definition may ensure that only portions of the data are visible to the receiver account and/or that no underlying schema about the data is visible to the receiver account. In an embodiment, the provider account provides the receiver account authorization to generate a certain materialized view that is generated over the provider's data. The provider account may grant this authorization and still prohibit the receiver account from viewing any of the actual data.

The materialized view component 914 generates and refreshes the materialized view. In an embodiment, the provider account generates the materialized view over its own data. The materialized view component 914 may generate the materialized view for the provider account. The materialized view component 914 may further grant cross-account access rights to the receiver account such that the receiver account can view the materialized view. In an embodiment, the receiver account requests the materialized view and the materialized view component 914 generates the materialized view. In such an embodiment, the materialized view component may be integrated into the execution platform of the receiver account.

The materialized view component 914 refreshes the materialized view with respect to its source table. In an embodiment, the materialized view is generated and stored by a receiver account and the source table for the materialized view is stored and managed by the provider account. When an update is made to data in the source table, the materialized view component 914 is configured to refresh the materialized view to propagate the update to the materialized view. If the source table has been updated and those updates have not yet been propagated to the materialized view, then the materialized view is stale with respect to its source table. According to the systems, methods, and devices disclosed herein, queries can still be executed using a stale materialized view by merging the materialized view with its source table to identify any discrepancies between the materialized view and the source table. The materialized view component 914 is configured to merge the materialized view with its source table to identify whether any updates have been made to the source table since a last refresh of the materialized view.

The materialized view component 914 is configured to share a materialized view. In an embodiment, the materialized view component 914 shares a materialized view with another account in a multiple tenant database. The materialized view component 914 may cause the materialized view to be automatically refreshed with respect to its source table so that the shared version of the materialized view is up-to-date with respect to data in the source table. The materialized view may be shared with the other account such that the other account only has visibility into the summary information contained in the materialized view and does not have visibility into the source table for the materialized view or any underlying schema, data, metadata, and so forth.

Figure 10:
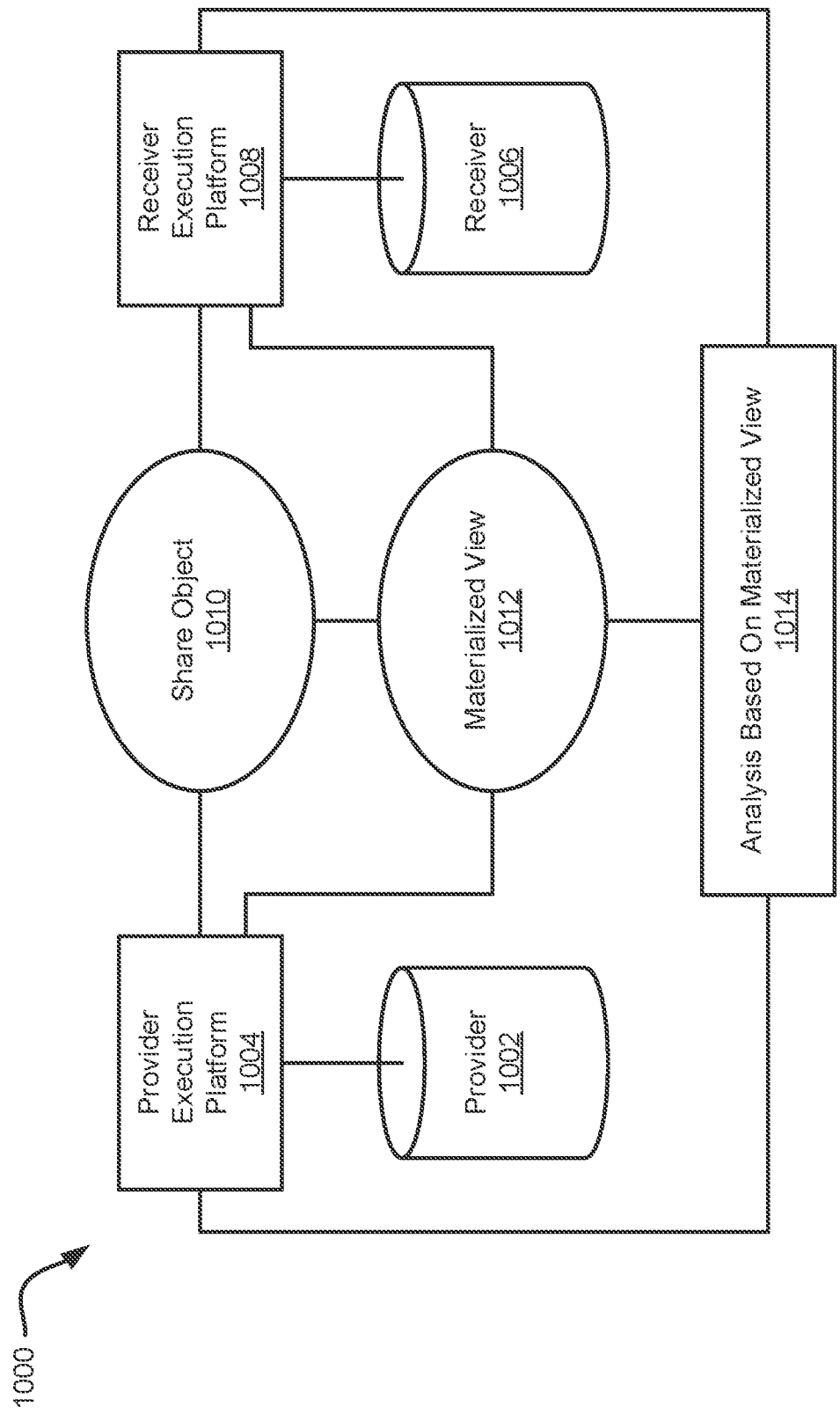
FIG. 10 is a schematic diagram of a system and process flow for generating a materialized view over shared data, according to one embodiment.

FIG. 10 is a schematic diagram of a system 1000 for generating a materialized view over shared data. The materialized view is generated over stored data that is associated with a provider 1002 account. The provider 1002 account includes a provider execution platform 1004 configured for executing tasks on the provider 1002 data. The provider 1002 data is accessed by a receiver 1006 account by the receiver execution platform 1008 by way of a share object 1010. It should be appreciated that the terms "provider" and "receiver" are illustrative only and may alternatively be referred to as a first account and a second account, as a provider and a consumer, and so forth. A materialized view 1012 may be generated over data in the share object 1010 data by either of the provider 1002 or the receiver 1006. Analysis based on the materialized view 1014 may be performed by either of the provider 1002 or the receiver 1006.

In an embodiment, the provider 1002 and the receiver 1006 are different accounts associated with the same cloud-based database administrator. In an embodiment, the provider 1002 and the receiver 1006 are associated with different cloud-based and/or traditional database systems. The provider 1002 includes a provider execution platform 1004 having one or more execution nodes capable of executing processing tasks on the database data of the provider 1002, wherein the database data is stored in a data store associated with the provider 1002. Similarly, the receiver 1006 includes a receiver execution platform 1008 having one or more execution nodes capable of executing processing tasks on the database data of the receiver 1006, wherein the database data is stored on a data store associated with the receiver 1006. The data store may include cloud-based scalable storage such that the database data is spread across a plurality of shared storage devices accessible by an execution platform such as 1004 or 1008. The materialized view 1012 is generated by either of the provider 1002 or the receiver 1006. When the materialized view 1012 is generated by the provider 1002, the provider execution platform 1004 may directly access provider 1002 data. When the materialized view 1012 is generated by the receiver 1006, the receiver execution platform 1008 may generate the materialized view 1012 by reading data in the share object 1010. The data in the share object 1010 is owned by the provider 1002 and made accessible to the receiver 1006. The data in the share object 1010 may have a secure view definition.

In an embodiment, the share object 1010 is defined by the provider 1002 and made available to the receiver 1006. The share object 1010 is an instantaneous and zero-copy means for the receiver 1006 to access data or other objects owned by the provider 1002. The share object 1010 may be data, a table, one or more micro-partitions of a table, a materialized view, a function, a user-defined function, schema, and so forth. The share object 1010 may be defined by the provider execution platform 1004 and made accessible to the receiver execution platform 1008. The share object 1010 may provide read-only (and not write) access to provider 1002 data such that the receiver execution platform 1008 can read provider 1002 data but cannot update or add to the provider 1002 data. The share object 1010 may include a secure view definition such that the receiver execution platform 1008 cannot see underlying data in the base table owned by the provider 1002.

The materialized view 1012 can be generated by either of the provider 1002 and/or the receiver 1006. The provider 1002 may generate a materialized view directly over its data stored in disk or cache storage. The provider 1002 may make the materialized view 1012 available to the receiver 1006 directly and/or by way of the share object 1010. The materialized view 1012 may have a secure view definition such that underlying data cannot be seen by other accounts (including the receiver 1006) but the result of the materialized view may be seen. The receiver 1006 may generate the materialized view over data in the share object 1010. In an embodiment, the provider 1002 is notified when another account such as the receiver 1006 generates a materialized view 1012 over provider 1002 data. In an embodiment, the provider 1002 is not notified if an authorized receiver 1006 account generates a materialized view 1012 over data within a share object 1010.

Figure 11:
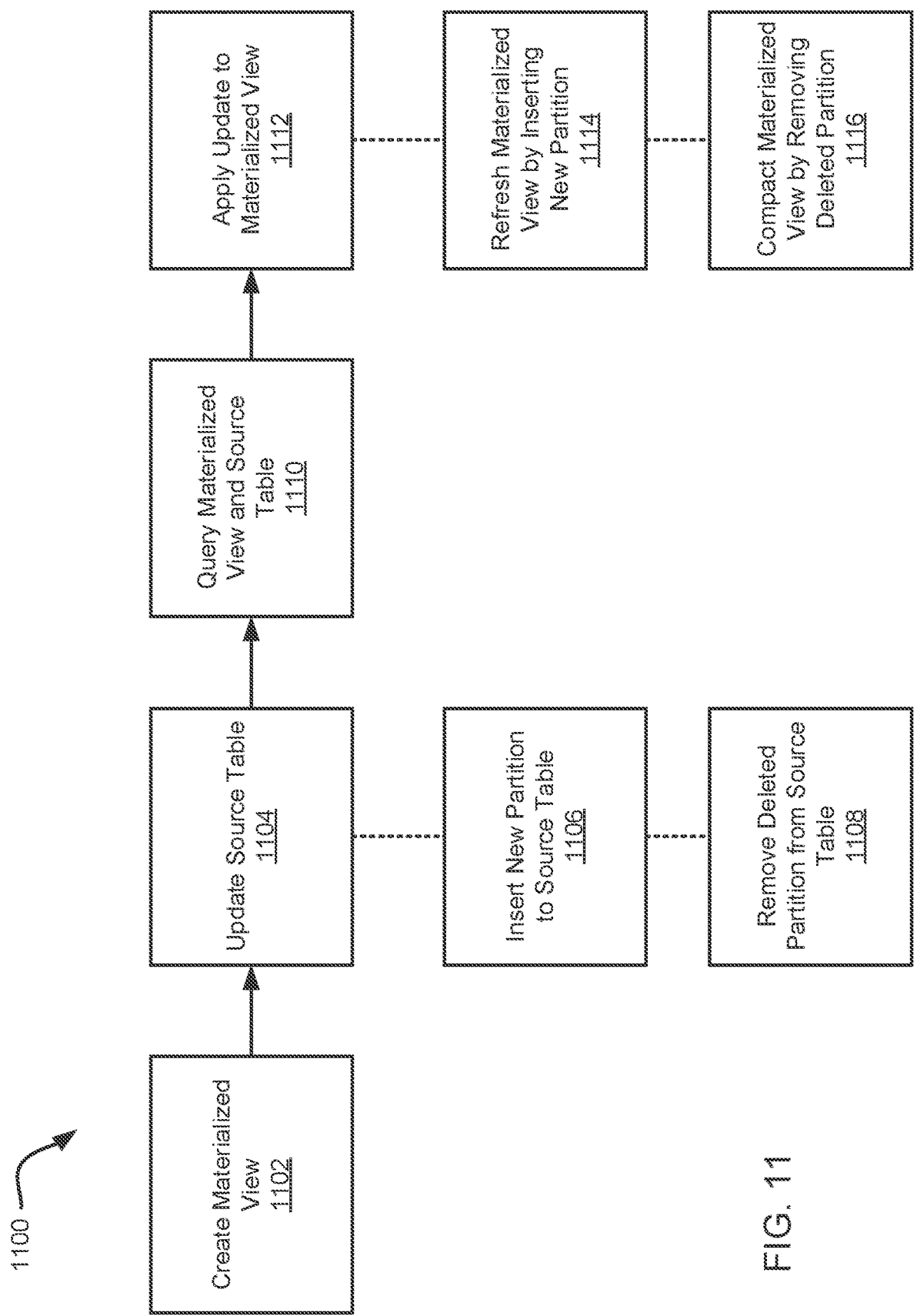
FIG. 11 is a schematic diagram of a process flow for generating and refreshing a materialized view, according to one embodiment.

FIG. 11 illustrates a schematic block diagram of a process flow 1100 for incremental updating of a materialized view. The process flow 1100 may be carried out by any suitable computing device, including for example a compute service manager 1402 (see FIG. 14) and/or a share component 210. The process flow 1100 includes creating a materialized view at 1102, wherein the materialized view is based on a source table. The process flow 1100 includes updating the source table at 1104, which may include inserting a new micro-partition into the source table at 1106 and/or removing a deleted micro-partition from the source table at 1108. The process flow 1100 includes querying the materialized view and the source table at 1110. Querying at 1110 includes detecting whether any updates have occurred on the source table that are not reflected in the materialized view. For example, a new micro-partition may be added to the source table that has not been added to the materialized view. A deleted micro-partition may be removed from the source table that still remains in the materialized view. The process flow 1100 includes applying the update to the materialized view at 1112. Applying the update 1112 may include refreshing the materialized view by inserting the new micro-partition into the materialized view at 1114 and/or compacting the materialized view by removing the deleted micro-partition at 1116.

Figure 12:
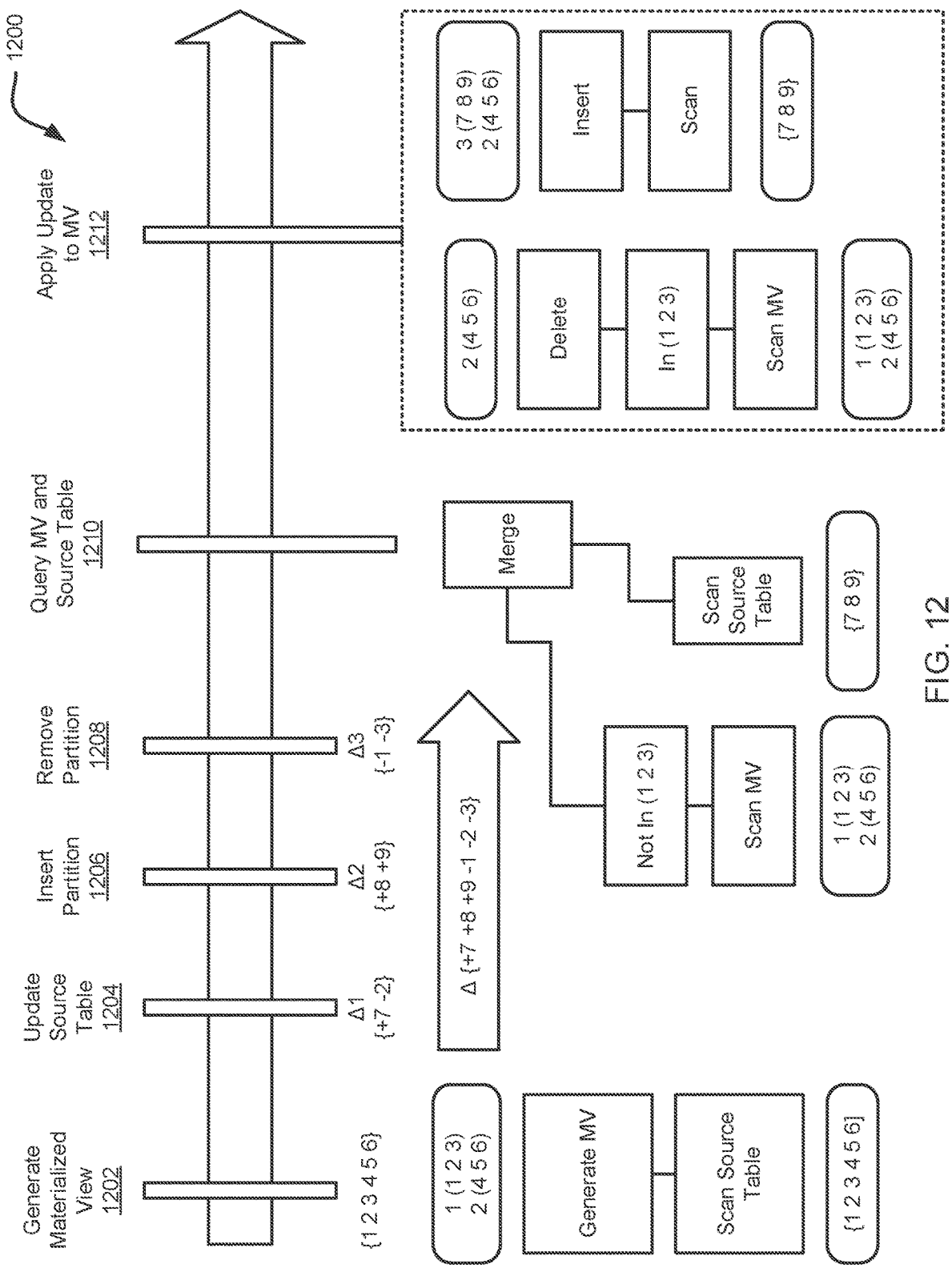
FIG. 12 is a schematic diagram of a process flow for updating a source table of a materialized view and refreshing the materialized view with respect to its source table, according to one embodiment.

FIG. 12 illustrates a schematic block diagram of an example process flow 1200 for incremental updating of a materialized view. The process flow 1200 may be carried out by any suitable computing device, including for example a compute service manager 1402 (see FIG. 14) and/or a share component 210. The process flow 1200 includes generating a materialized view at 1202 that is based on a source table. The process flow 1200 includes updating the source table at 1204 which may include inserting a micro-partition at 1206 and/or removing a micro-partition at 1208. The process flow includes querying the materialized view and the source table at 1210 to detect any updates to the source table that are not reflected in the materialized view. The process flow 1200 includes applying the update to the materialized view at 1212.

In an embodiment, the source table is owned by a provider account and the materialized view is generated at 1202 by a receiver account. The source table may be stored across one or more of a plurality of shared storage devices that are shared amongst multiple accounts in a multiple tenant database system. The provider account and the receiver account may each store and manage database data within the database system. The provider account may store and manage database data within the database system and the receiver account may be connected with the database system solely for viewing and/or querying data that is owned and/or managed by other accounts without storing any of its own data. Separate execution resources may be associated with each of the provider account and the receiver account. In an embodiment, the source table is associated with the provider account. The provider account provides cross-account access rights to the receiver account such that the receiver account can view the data in the source table, can view a portion of the data in the source table, can generate a materialized view over the source table, can query the source table, and/or can run user-defined functions over the source table. The provider account may generate a "share object" that includes any of the aforementioned access rights.

The share object may have a secure view definition such that portions of the source table are hidden from the receiver account. The receiver account may have unlimited access to the source table such that the receiver account can view underlying data, schema, organizational structures, and so forth. The receiver account may have limited access to the source table such that the receiver account may only view a result of a query or materialized view without viewing any underlying data, schema, organizational structures, and so forth. The provider account may determine the level of access that is granted to the receiver account, and the specific parameters of the access can be tailored to the type of data stored in the source table and the needs of the provider account to keep certain aspects of the data hidden from view.

In an embodiment, the materialized view is generated at 1202 by execution resources allocated to the receiver account and/or the materialized view is requested by a user associated with the receiver account. After the receiver account receives the share object from the provider account, the receiver account may have access to generate a materialized view over the source table. The materialized view generated by the receiver account may be stored in disk storage or cache storage that is allocated to the receiver account. The materialized view generated by the receiver account may be stored in disk storage or cache storage that is allocated to the provider account and is made accessible to the receiver account.

In an embodiment, the materialized view is generated at 1202 by execution resources allocated to the provider account and/or the materialized view is requested by a user associated with the provider account. The materialized view may be generated and managed by the provider account and made accessible to one or more receiver accounts. In an embodiment, the materialized view itself is the share object that can be accessed by one or more receiver accounts.

Regardless of whether the provider account or the receiver account generated or requested the materialized view, the source table is updated at 1203 by the provider account. The source table may be owned and managed by the provider account and one or more receiver accounts may have read-only access to the source table. A user associated with the provider account may enter Data Manipulation Language (DML) commands to update the source table. Such DML commands may cause new data to be inserted into the source table, may cause data to be deleted from the source table, may cause data to be merged, and/or may cause data to be updated or changed in the source table. In an embodiment, one or more micro-partitions of the source table are regenerated for any change that occurs to the source table. For example, an insert command may simply cause one or more new micro-partitions to be generated without altering any existing micro-partitions. A delete command may remove rows from the source table and the delete command may be executed by regenerating one or more micro-partitions such that the deleted rows are removed from the one or more micro-partitions. An update command may change a data entry in the source table and the update command may be executed by regenerating one or more micro-partitions such that the modified rows are deleted and regenerated with the updated information. When the provider account updates the source table at 1204, a notification may be provided to the receiver account that the materialized view is now stale with respect to the source table. The materialized view may be automatically refreshed to reflect any updates made to the source table.

In the example illustrated in FIG. 12, the materialized view is generated at 1202 by scanning a source table. The source table includes the dataset {1 2 3 4 5 6} as illustrated. Each of the reference numerals {1 2 3 4 5 6} may represent a micro-partition within the source table. It should be appreciated that the source table may have any number of micro-partitions and may have many hundreds or thousands of micro-partitions. The corresponding materialized view includes the data sets [1(1 2 3)] and [2(4 5 6)] that may indicate micro-partitions in the database, where the micro-partitions are immutable storage objects in the database. The materialized view may be separated into the first data set [1(1 2 3)] and the second data set [2(4 5 6)] because the materialized view includes too much data to be stored in a single data set. In an embodiment, the sizes of the data sets are determined based on cache storage capacity in an execution node that will process the materialized view. Each of the datasets of the materialized view, including [1(1 2 3)] and [2(4 5 6)] may itself be an immutable storage device referred to herein as a micro-partition. In an embodiment, the source table dataset {1 2 3 4 5 6} is stored across one or more storage devices allocated to the provider account. In various embodiments, the materialized view data sets [1(1 2 3)] and [2(4 5 6)] may be stored across one or more storage devices allocated to the provider account or the receiver account. When the materialized view datasets are stored in storage devices allocated to the provider account, the materialized view datasets may be made accessible to one or more receiver accounts without copying the materialized view datasets. The opposite is true, such that when the materialized view datasets are stored in storage devices allocated to the receiver account, the materialized view datasets may be made accessible to the provider account and/or one or more additional receiver accounts without copying the materialized view datasets.

In the example illustrated in FIG. 12, the source table is updated at 1204 (see Δ1) by adding (+7) and removing (−2). The update to the source table at 1204 may be executed by execution resources allocated to the provider account. In an embodiment, only the provider account has the ability to write data to the source table. Two micro-partitions are inserted into the source table at 1206 (see Δ2) by adding (+8) and adding (+9). Two micro-partitions are removed from the source table at 1208 (see Δ3) by removing (−1) and (−3). As illustrated in Δ (delta), the overall update to the source table includes {+7+8+9−1−2−3}, which includes each of the various updates (see Δ1, Δ2, and Δ3) that are made on the source table. The overall update to the source table adds micro-partitions numbered 7, 8, and 9 and deletes micro-partitions numbered 1, 2, and 3.

In the example illustrated in FIG. 12, the materialized view and the source table are queried at 1210. The query may be requested by either of the provider account or the receiver account. The receiver account may issue a query over the source table only if the receiver account has access rights that enable the receiver account to query the data in the source table. The processing time for the query can be hastened by using the materialized view. However, because the source table was updated at 1204, the materialized view is no longer fresh with respect to the source table. Execution of the query includes merging the materialized view and the source table to identify any modifications that have been made to the source table that are not reflected in the materialized view. After the materialized view and the source table have been merged, the materialized view is scanned the source table is scanned. The source table is scanned, and micro-partitions numbered {7 8 9} are detected in the source table and those micro-partitions are not detected in the materialized view. The materialized view is scanned, and the materialized view dataset [1(1 2 3)] is detected in the materialized view but is not detected in the source table. This materialized view dataset includes information about micro-partitions (1 2 3) in the source table, and micro-partitions (1 2 3) are no longer present in the source table because those micro-partitions were removed by the update command at 1204 and the delete command at 1208.

In the example illustrated in FIG. 12, the update is applied to the materialized view at 1212. The update to the materialized view may be executed by execution resources that are allocated to the account that requested and/or generated the materialized view. If the materialized view is stored in storage resources allocated to the provider account, then the materialized view may be updated by execution resources allocated to the provider account. If the materialized view is stored in storage resources allocated to the receiver account, then the materialized view may be refreshed by execution resources allocated to the receiver account. The materialized view is scanned, and the system detects the materialized view datasets [1(1 2 3)] and [2(4 5 6)], and the system detects that dataset [1(1 2 3)] is present in the materialized view but is not present in the source table. The system determines that the materialized view dataset [1(1 2 3)] should be removed from the materialized view. The system deletes the dataset [1(1 2 3)] such that the materialized view dataset [2(4 5 6)] remains. The system scans the source table and discovers the micro-partitions {7 8 9} are present in the source table but no information concerning those micro-partitions is present in the materialized view. The system updates the materialized view to include information about micro-partitions {7 8 9}. The materialized view is now refresh with respect to the source table and includes information about micro-partitions {4 5 6 7 8 9}. The materialized view now includes two datasets, namely [2(4 5 6)] and [3(7 8 9)].

Figure 13:
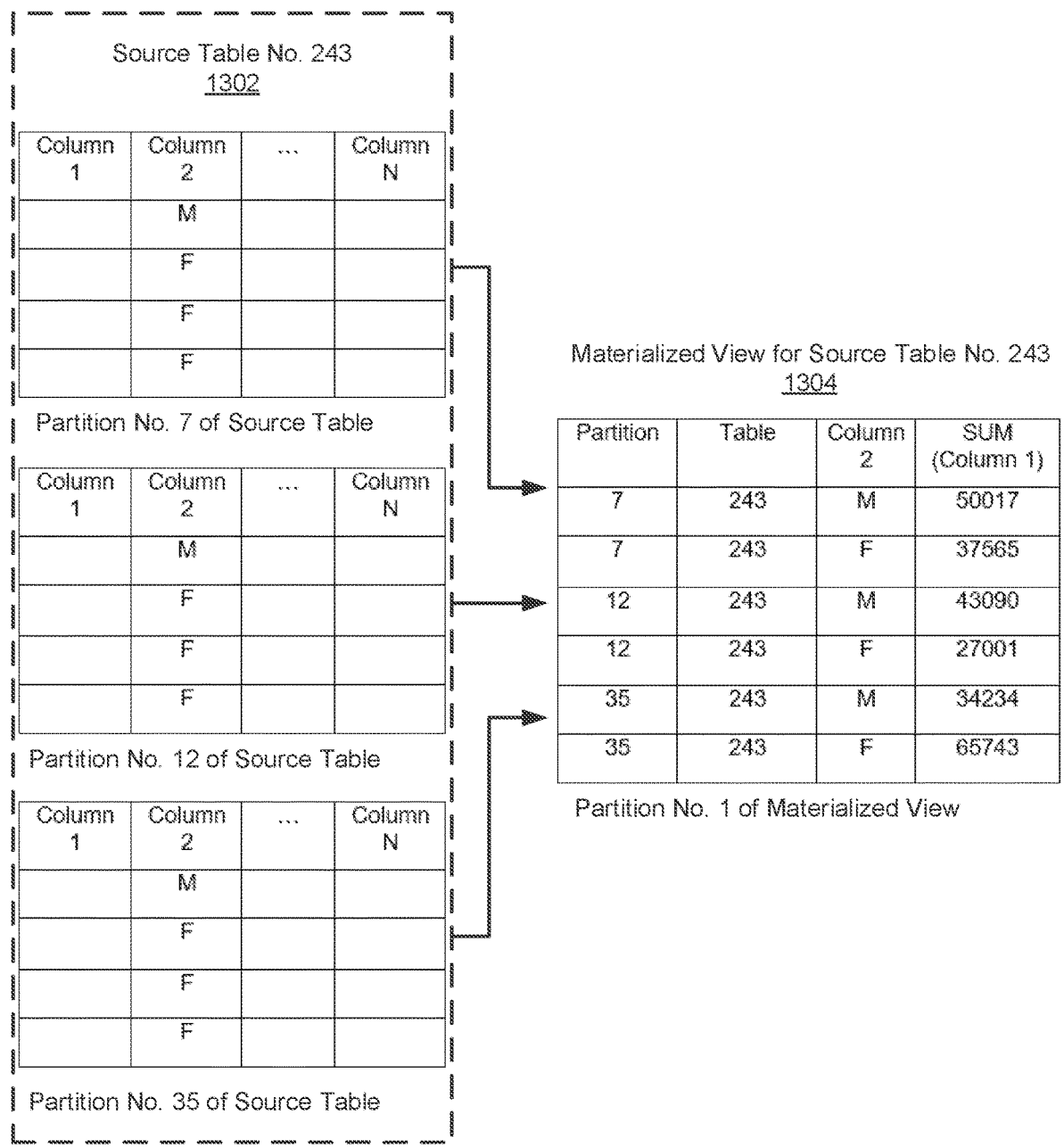
FIG. 13 is a schematic diagram of a materialized view, according to one embodiment.

FIG. 13 illustrates example micro-partitions of a source table 1302 and an example materialized view 1304 generated based on the source table. The source table 1302 undergoes a linear transformation to generate a plurality of micro-partitions (see Partition No. 7, Partition No. 12, and Partition No. 35). The plurality of micro-partitions may generate a single micro-partition of the materialized view 1304 in one embodiment as illustrated in FIG. 13. The micro-partitions are immutable storage objects in the database system. In an embodiment, the micro-partitions are represented as an explicit list of micro-partitions, and in certain embodiments this can be particularly costly. In an alternative embodiment, the micro-partitions are represented as a range of micro-partitions. In a preferred embodiment, the micro-partitions are represented as a DML version indicating a last refresh and last compaction of the source table 1302.

The example source table 1302 is labeled "Source Table No. 243" to illustrate that any number of source tables may be utilized to generate the materialized view 1304, the materialized view 1304 may index each of the numerous source tables (see "Table" column in materialized view 1304), and/or any number of numerous materialized views may be generated for a number of possible source tables. The source table 1302 includes three micro-partitions as illustrated in the example embodiment in FIG. 13. The three micro-partitions of the source table 1302 include Partition No. 7, Partition No. 12, and Partition No. 35. FIG. 13 illustrates that the micro-partitions are indexed in the materialized view 1304 under the "Partition" column. FIG. 13 further illustrates that the materialized view 1304 includes a single micro-partition based on the three micro-partitions of the source table 1302. Additional micro-partitions may be added to the materialized view 1304 and/or removed from the materialized view 1304 as the materialized view 1304 is incrementally updated.

The materialized view 1304 for the source table includes four columns as illustrated in the example implementation in FIG. 13. The partition column indicates which micro-partition of the source table is applicable to that row of the materialized view 1304. As shown in the example in FIG. 13, the partition column has rows for partition number 7, partition number 12, and partition number 35. In some embodiments, these partitions can refer to micro-partitions which constitute immutable storage devices that cannot be updated in-place. The materialized view 1304 includes a table column which indicates an identifier for the source table. In the example illustrated in FIG. 13, the identifier for the source table is number 243. The materialized view 1304 includes a "column 2" column which corresponds with the "column 2" in the source table. In the example illustrated in FIG. 13, column 2 of the source table may have an "M" entry or a "F" entry to indicate whether the person identified in that row is a male or female. It should be appreciated that the data in the exemplary column 2 could include any suitable information. Common data entries that may be of interest include, for example, names, addresses, identifying information, pricing information, statistic information, demographic information, descriptor information, and so forth. It should be appreciated that there is no limit to what data is stored in the column and that the male/female identifier illustrated in FIG. 13 is for example purposes only. The materialized view 1304 further includes a SUM column. The SUM column indicates how many entries in each partition have a "male" or "female" identifier in column 2. In the example implementation, partition 7 includes 50,017 male identifier and 37,565 female identifier; partition 12 includes 43,090 male identifiers and 27,001 female identifiers; and partition 35 includes 34,234 male identifiers and 65,743 female identifiers. It should be appreciated that the SUM column in the example materialized view 1304 is for illustration purposes only. The materialized view 1304 does not necessarily provide a data sums for the source table but may provide any desired metric. The calculation shown in the materialized view 1304 will be determined on a case-by-case basis based on the needs of the party that requests the materialized view.

As illustrated in FIG. 13, the metadata between the source table 1302 and the materialized view 1304 is consistent. The metadata of the materialized view 1304 is updated to reflect any updates to the metadata of the source table 1302.

Figure 14:
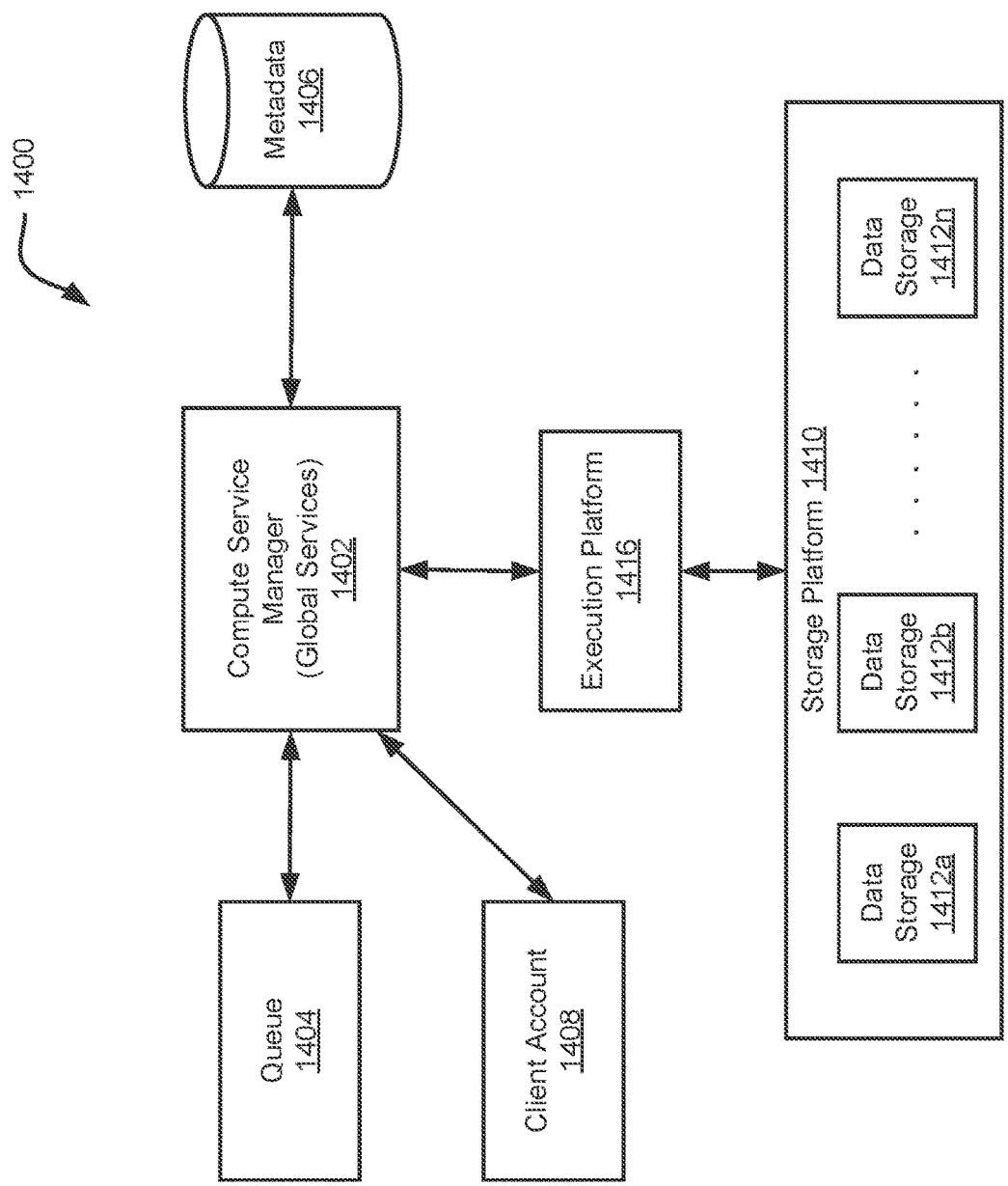
FIG. 14 is schematic block diagram of a data processing platform including a compute service manager, according to one embodiment.

FIG. 14 is a block diagram depicting an example embodiment of a data processing platform 1400. As shown in FIG. 14, a compute service manager 1402 is in communication with a queue 1404, a client account 1408, metadata 1406, and an execution platform 1416. In an embodiment, the compute service manager 1402 does not receive any direct communications from a client account 1408 and only receives communications concerning jobs from the queue 1404. In particular implementations, the compute service manager 1402 can support any number of client accounts 208 such as end users providing data storage and retrieval requests, system administrators managing the systems and methods described herein, and other components/devices that interact with compute service manager 1402. As used herein, compute service manager 1402 may also be referred to as a "global services system" that performs various functions as discussed herein.

The compute service manager 1402 is in communication with a queue 1404. The queue 1404 may provide a job to the compute service manager 1402 in response to a trigger event. One or more jobs may be stored in the queue 1404 in an order of receipt and/or an order of priority, and each of those one or more jobs may be communicated to the compute service manager 1402 to be scheduled and executed. The queue 1404 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth. In an embodiment, the queue 1404 includes entries for refreshing a materialized view. The queue 1404 may include entries for refreshing a materialized view that is generated over a local source table (i.e. local to the same account operating the compute service manager 1402) and/or refreshing a materialized view that is generated over a shared source table that is managed by a different account.

The compute service manager 1402 is also coupled to metadata 1406, which is associated with the entirety of data stored throughout data processing platform 1400. In some embodiments, metadata 1406 includes a summary of data stored in remote data storage systems as well as data available from a local cache. Additionally, metadata 1406 may include information regarding how data is organized in the remote data storage systems and the local caches. Metadata 1406 allows systems and services to determine whether a piece of data needs to be accessed without loading or accessing the actual data from a storage device.

In an embodiment, the compute service manager 1402 and/or the queue 1404 may determine that a job should be performed based on the metadata 1406. In such an embodiment, the compute service manager 1402 and/or the queue 1404 may scan the metadata 1406 and determine that a job should be performed to improve data organization or database performance. For example, the compute service manager 1402 and/or the queue 1404 may determine that a new version of a source table for a materialized view has been generated and the materialized view has not been refreshed to reflect the new version of the source table. The metadata 1406 may include a transactional change tracking stream indicating when the new version of the source table was generated and when the materialized view was last refreshed. Based on that metadata 1406 transaction stream, the compute service manager 1402 and/or the queue 1404 may determine that a job should be performed. In an embodiment, the compute service manager 1402 determines that a job should be performed based on a trigger event and stores the job in the queue 1404 until the compute service manager 1402 is ready to schedule and manage the execution of the job.

The compute service manager 1402 may receive rules or parameters from the client account 1408 and such rules or parameters may guide the compute service manager 1402 in scheduling and managing internal jobs. The client account 1408 may indicate that internal jobs should only be executed at certain times or should only utilize a set maximum amount of processing resources. The client account 1408 may further indicate one or more trigger events that should prompt the compute service manager 1402 to determine that a job should be performed. The client account 1408 may provide parameters concerning how many times a task may be re-executed and/or when the task should be re-executed.

The compute service manager 1402 is further coupled to an execution platform 1416, which provides multiple computing resources that execute various data storage and data retrieval tasks, as discussed in greater detail below. Execution platform 1416 is coupled to multiple data storage devices 1412*a*, 1412*b*, and 1412*n* that are part of a storage platform 1410. Although three data storage devices 1412*a*, 1412*b*, and 1412*n* are shown in FIG. 14, execution platform 1416 is capable of communicating with any number of data storage devices. In some embodiments, data storage devices 1412*a*, 1412*b*, and 1412*n* are cloud-based storage devices located in one or more geographic locations. For example, data storage devices 1412*a*, 1412*b*, and 1412*n* may be part of a public cloud infrastructure or a private cloud infrastructure. Data storage devices 1412*a*, 1412*b*, and 1412*n* may be hard disk drives (HDDs), solid state drives (SSDs), storage clusters, Amazon S3™ storage systems or any other data storage technology. Additionally, storage platform 1410 may include distributed file systems (such as Hadoop Distributed File Systems (HDFS)), object storage systems, and the like.

In particular embodiments, the communication links between compute service manager 1402, the queue 1404, metadata 1406, the client account 1408, and the execution platform 1416 are implemented via one or more data communication networks. Similarly, the communication links between execution platform 1416 and data storage devices 1412*a*-1412*n* in the storage platform 1410 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 14, data storage devices 1412*a*, 1412*b*, and 1412*n* are decoupled from the computing resources associated with the execution platform 1416. This architecture supports dynamic changes to data processing platform 1400 based on the changing data storage/retrieval needs as well as the changing needs of the users and systems accessing data processing platform 1400. The support of dynamic changes allows data processing platform 1400 to scale quickly in response to changing demands on the systems and components within data processing platform 1400. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 1402, queue 1404, metadata 1406, client account 1408, execution platform 1416, and storage platform 1410 are shown in FIG. 14 as individual components. However, each of compute service manager 1402, queue 1404, metadata 1406, client account 1408, execution platform 1416, and storage platform 1410 may be implemented as a distributed system (e.g., distributed across multiple systems/platforms at multiple geographic locations). Additionally, each of compute service manager 1402, metadata 1406, execution platform 1416, and storage platform 1410 can be scaled up or down (independently of one another) depending on changes to the requests received from the queue 1404 and/or client accounts 208 and the changing needs of data processing platform 1400. Thus, in the described embodiments, data processing platform 1400 is dynamic and supports regular changes to meet the current data processing needs.

During typical operation, data processing platform 1400 processes multiple jobs received from the queue 1404 or determined by the compute service manager 1402. These jobs are scheduled and managed by the compute service manager 1402 to determine when and how to execute the job. For example, the compute service manager 1402 may divide the job into multiple discrete tasks and may determine what data is needed to execute each of the multiple discrete tasks. The compute service manager 1402 may assign each of the multiple discrete tasks to one or more nodes of the execution platform 1416 to process the task. The compute service manager 1402 may determine what data is needed to process a task and further determine which nodes within the execution platform 1416 are best suited to process the task. Some nodes may have already cached the data needed to process the task and, therefore, be a good candidate for processing the task. Metadata 1406 assists the compute service manager 1402 in determining which nodes in the execution platform 1416 have already cached at least a portion of the data needed to process the task. One or more nodes in the execution platform 1416 process the task using data cached by the nodes and, if necessary, data retrieved from the storage platform 1410. It is desirable to retrieve as much data as possible from caches within the execution platform 1416 because the retrieval speed is typically much faster than retrieving data from the storage platform 1410.

As shown in FIG. 14, the data processing platform 1400 separates the execution platform 1416 from the storage platform 1410. In this arrangement, the processing resources and cache resources in the execution platform 1416 operate independently of the data storage resources 1412a-1412n in the storage platform 1410. Thus, the computing resources and cache resources are not restricted to specific data storage resources 1412a-1412n. Instead, all computing resources and all cache resources may retrieve data from, and store data to, any of the data storage resources in the storage platform 1410. Additionally, the data processing platform 1400 supports the addition of new computing resources and cache resources to the execution platform 1416 without requiring any changes to the storage platform 1410. Similarly, the data processing platform 1400 supports the addition of data storage resources to the storage platform 1410 without requiring any changes to nodes in the execution platform 1416.

Figure 15:
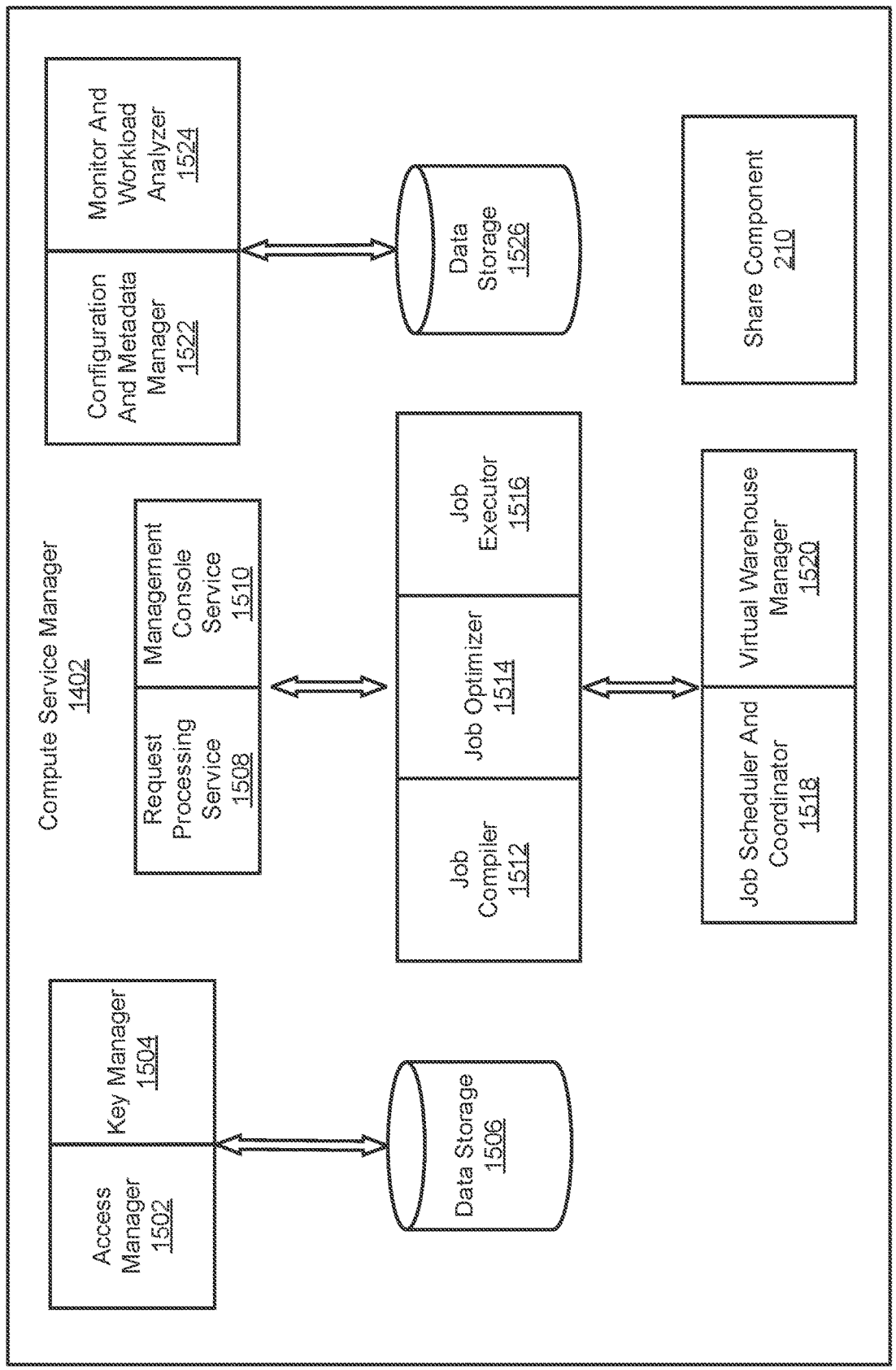
FIG. 15 is a schematic block diagram of a compute service manager, according to one embodiment.

FIG. 15 is a block diagram depicting an embodiment of the compute service manager 1402. As shown in FIG. 15, the compute service manager 1402 includes an access manager 1502 and a key manager 1504 coupled to a data storage device 1506. Access manager 1502 handles authentication and authorization tasks for the systems described herein. Key manager 1504 manages storage and authentication of keys used during authentication and authorization tasks. For example, access manager 1502 and key manager 1504 manage the keys used to access data stored in remote storage devices (e.g., data storage devices in storage platform 1410). As used herein, the remote storage devices may also be referred to as "persistent storage devices" or "shared storage devices." A request processing service 1508 manages received data storage requests and data retrieval requests (e.g., jobs to be performed on database data). For example, the request processing service 1508 may determine the data necessary to process the received data storage request or data retrieval request. The necessary data may be stored in a cache within the execution platform 1416 (as discussed in greater detail below) or in a data storage device in storage platform 1410. A management console service 1510 supports access to various systems and processes by administrators and other system managers. Additionally, the management console service 1510 may receive a request to execute a job and monitor the workload on the system.

The compute service manager 1402 also includes a job compiler 1512, a job optimizer 1514 and a job executor 1510. The job compiler 1512 parses a job into multiple discrete tasks and generates the execution code for each of the multiple discrete tasks. The job optimizer 1514 determines the best method to execute the multiple discrete tasks based on the data that needs to be processed. The job optimizer 1514 also handles various data pruning operations and other data optimization techniques to improve the speed and efficiency of executing the job. The job executor 1516 executes the execution code for jobs received from the queue 1404 or determined by the compute service manager 1402.

A job scheduler and coordinator 1518 sends received jobs to the appropriate services or systems for compilation, optimization, and dispatch to the execution platform 1416. For example, jobs may be prioritized and processed in that prioritized order. In an embodiment, the job scheduler and coordinator 1518 determines a priority for internal jobs that are scheduled by the compute service manager 1402 with other "outside" jobs such as user queries that may be scheduled by other systems in the database but may utilize the same processing resources in the execution platform 1416. In some embodiments, the job scheduler and coordinator 1518 identifies or assigns particular nodes in the execution platform 1416 to process particular tasks. A virtual warehouse manager 1520 manages the operation of multiple virtual warehouses implemented in the execution platform 1416. As discussed below, each virtual warehouse includes multiple execution nodes that each include a cache and a processor.

Additionally, the compute service manager 1402 includes a configuration and metadata manager 1522, which manages the information related to the data stored in the remote data storage devices and in the local caches (i.e., the caches in execution platform 1416). As discussed in greater detail below, the configuration and metadata manager 1522 uses the metadata to determine which data files need to be accessed to retrieve data for processing a particular task or job. A monitor and workload analyzer 1524 oversees processes performed by the compute service manager 1402 and manages the distribution of tasks (e.g., workload) across the virtual warehouses and execution nodes in the execution platform 1416. The monitor and workload analyzer 1524 also redistributes tasks, as needed, based on changing workloads throughout the data processing platform 1400 and may further redistribute tasks based on a user (i.e. "external") query workload that may also be processed by the execution platform 1416. The configuration and metadata manager 1522 and the monitor and workload analyzer 1524 are coupled to a data storage device 1526. Data storage devices 1506 and 1526 in FIG. 15 represent any data storage device within data processing platform 1400. For example, data storage devices 1506 and 1526 may represent caches in execution platform 1416, storage devices in storage platform 1410, or any other storage device.

The compute service manager 1402 also includes a share component 210 as disclosed herein. The share component 210 is configured to provide cross-account access rights and may further be configured to generate and update cross-account materialized views.

Figure 16:
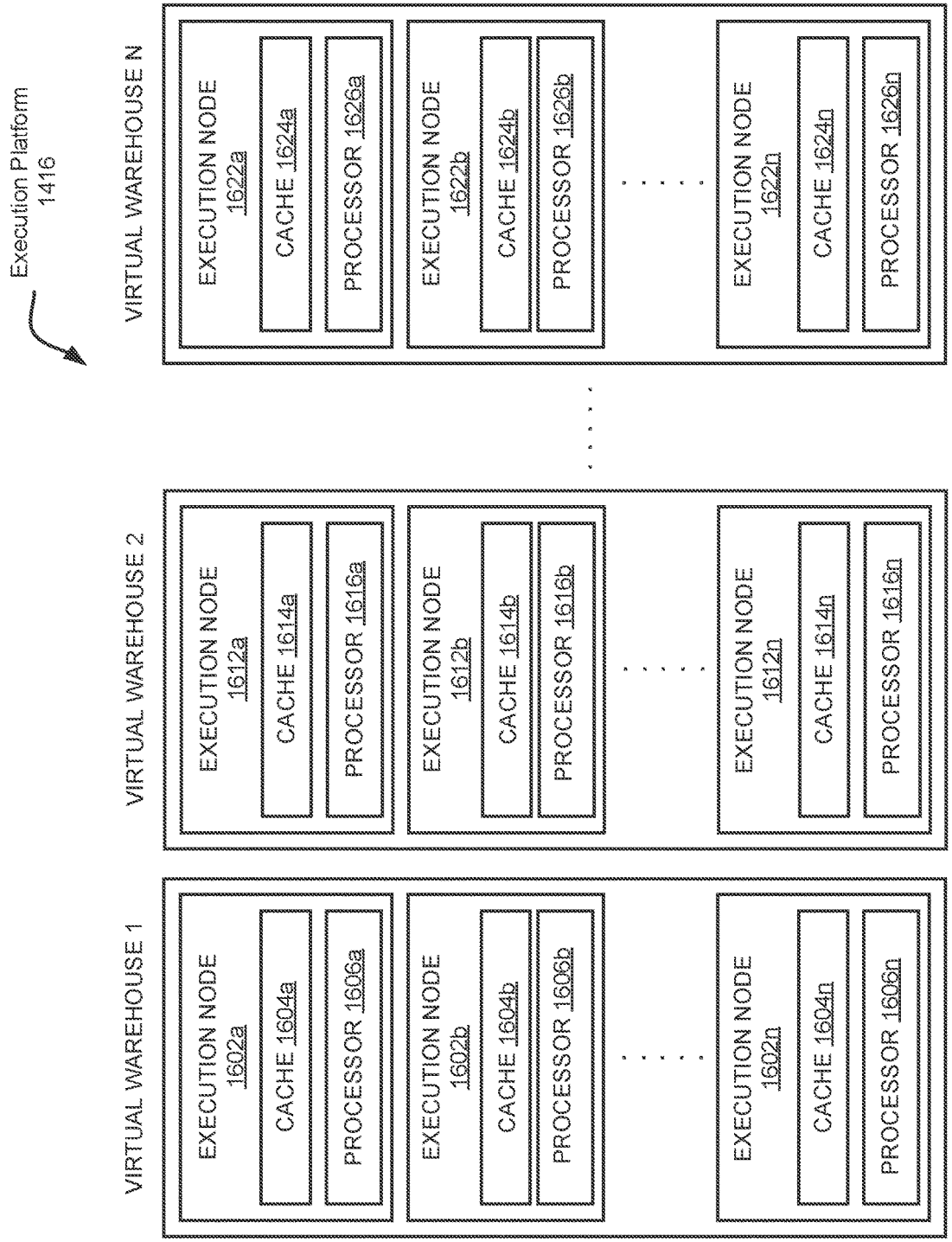
FIG. 16 is a schematic block diagram of an execution platform, according to one embodiment.

FIG. 16 is a block diagram depicting an embodiment of an execution platform 1416. As shown in FIG. 16, execution platform 1416 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 1416 can add new virtual warehouses and drop existing virtual warehouses in real-time based on the current processing needs of the systems and users. This flexibility allows the execution platform 1416 to quickly deploy large amounts of computing resources when needed without being forced to continue paying for those computing resources when they are no longer needed. All virtual warehouses can access data from any data storage device (e.g., any storage device in storage platform 1410).

Although each virtual warehouse shown in FIG. 16 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1412a-1412n shown in FIG. 14. Thus, the virtual warehouses are not necessarily assigned to a specific data storage device 1412a-1412n and, instead, can access data from any of the data storage devices 1412a-1412n within the storage platform 1410. Similarly, each of the execution nodes shown in FIG. 16 can access data from any of the data storage devices 1412a-1412n. In some embodiments, a particular virtual warehouse or a particular execution node may be temporarily assigned to a specific data storage device, but the virtual warehouse or execution node may later access data from any other data storage device.

In the example of FIG. 16, virtual warehouse 1 includes three execution nodes 1602a, 1602b, and 1602n. Execution node 1602a includes a cache 1604a and a processor 1606a. Execution node 1602b includes a cache 1604b and a processor 1606b. Execution node 1602n includes a cache 1604n and a processor 1606n. Each execution node 1602a, 1602b, and 1602n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1612a, 1612b, and 1612n. Execution node 1612a includes a cache 1614a and a processor 1616a. Execution node 1612n includes a cache 1614n and a processor 1616n. Execution node 1612n includes a cache 1614n and a processor 1616n. Additionally, virtual warehouse 3 includes three execution nodes 1622a, 1622b, and 1622n. Execution node 1622a includes a cache 1624a and a processor 1626a. Execution node 1622b includes a cache 1624b and a processor 1626b. Execution node 1622n includes a cache 1624n and a processor 1626n.

In some embodiments, the execution nodes shown in FIG. 16 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 16 each include one data cache and one processor, alternate embodiments may include execution nodes containing any number of processors and any number of caches. Additionally, the caches may vary in size among the different execution nodes. The caches shown in FIG. 16 store, in the local execution node, data that was retrieved from one or more data storage devices in storage platform 1410. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 1410.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 1416, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 16 as having multiple execution nodes. The multiple execution nodes associated with each virtual warehouse may be implemented using multiple computing systems at multiple geographic locations. For example, an instance of virtual warehouse 1 implements execution nodes 1602a and 1602b on one computing platform at a geographic location and implements execution node 1602n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 1416 is also fault tolerant. For example, if one virtual warehouse fails, that virtual warehouse is quickly replaced with a different virtual warehouse at a different geographic location.

A particular execution platform 1416 may include any number of virtual warehouses. Additionally, the number of virtual warehouses in a particular execution platform is dynamic, such that new virtual warehouses are created when additional processing and/or caching resources are needed.

Similarly, existing virtual warehouses may be deleted when the resources associated with the virtual warehouse are no longer necessary.

In some embodiments, the virtual warehouses may operate on the same data in storage platform 1410, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In an embodiment, distinct execution platforms 1416 are allocated to different accounts in the multiple tenant database 100. This can ensure that data stored in cache in the distinct execution platforms 1416 is made accessible only to the associated account. The size of each distinct execution platform 1416 can be tailored to the processing needs of each account in the multiple tenant database 100. In an embodiment, a provider account has its own execution platform 1416 and a receiver account has its own execution platform 1416. In an embodiment, a receiver account receives a share object from the provider account that enables the receiver account to generate a materialized view over data owned by the provider account. The execution platform 1416 of the receiver account may generate the materialized view. When an update is made to the source table for the materialized view (i.e. the data owned by the provider account), the execution platform 1416 of the provider account will execute the update. If the receiver account generated the materialized view, then the execution platform 1416 of the receiver account may be responsible for refreshing the materialized view with respect to its source table.

Figure 17:
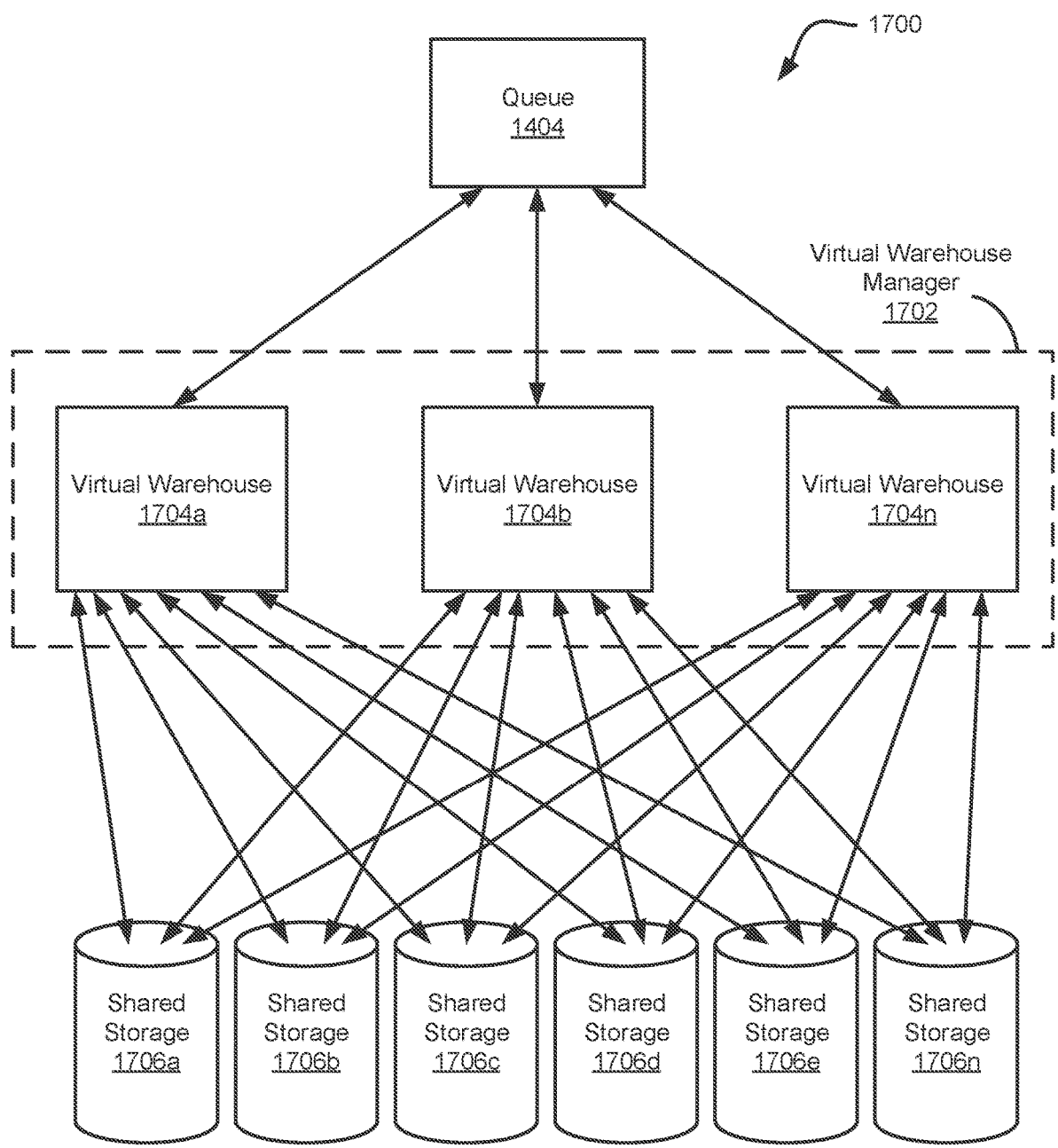
FIG. 17 is a schematic block diagram of a database processing environment, according to one embodiment.

FIG. 17 is a block diagram depicting an example operating environment 1700 with the queue 1404 in communication with multiple virtual warehouses under a virtual warehouse manager 1702. In environment 1700, the queue 1404 has access to multiple database shared storage devices 1706a, 1706b, 1706c, 1706d, 1706e and 1706n through multiple virtual warehouses 1704a, 1704b, and 1704n. Although not shown in FIG. 17, the queue 1404 may access virtual warehouses 1704a, 1704b, and 1704n through the compute service manager 1402 (see FIG. 1). In particular embodiments, databases 1706a-1706n are contained in the storage platform 1410 and are accessible by any virtual warehouse implemented in the execution platform 1416. In some embodiments, the queue 1404 may access one of the virtual warehouses 1704a-1704n using a data communication network such as the Internet. In some implementations, a client account may specify that the queue 1404 (configured for storing internal jobs to be completed) should interact with a particular virtual warehouse 1704a-1704n at a particular time.

In an embodiment (as illustrated), each virtual warehouse 1704a-1704n can communicate with all databases 1706a-1706n. In some embodiments, each virtual warehouse 1704a-1704n is configured to communicate with a subset of all databases 1706a-1706n. In such an arrangement, an individual client account associated with a set of data may send all data retrieval and data storage requests through a single virtual warehouse and/or to a certain subset of the databases 1706a-1706n. Further, where a certain virtual warehouse 1704a-1704n is configured to communicate with a specific subset of databases 1706a-1706n, the configuration is dynamic. For example, virtual warehouse 1704a may be configured to communicate with a first subset of databases 1706a-1706n and may later be reconfigured to communicate with a second subset of databases 1706a-1706n.

In an embodiment, the queue 1404 sends data retrieval, data storage, and data processing requests to the virtual warehouse manager 1702, which routes the requests to an appropriate virtual warehouse 1704a-1704n. In some implementations, the virtual warehouse manager 1702 provides a dynamic assignment of jobs to the virtual warehouses 1704a-1704n.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 1416, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

FIG. 18 is a schematic block diagram of a method 1800 for cross-account generation of a materialized view in a multiple tenant database system. The method 1800 may be carried out by any suitable computing device such as a compute service manager 1402, a share component 210, and or a materialized view component 914. The method 1800 may be carried about by processing resources allocated to a first account and/or a second account.

The method 1800 begins and a computing resource defines at 1802 a share object in a first account. The share object includes data associated with the first account. The method 1800 includes granting at 1804 cross-account access rights to the share object to a second account such that the second account has access to the share object without copying the share object. The method 1800 includes generating at 1806 a materialized view over the share object. The method 1800 includes updating at 1808 the data associated with the first account. The method 1800 includes identifying at 1810 whether the materialized view is stale with respect to the share object by merging the materialized view and the share object.

Figure 19:
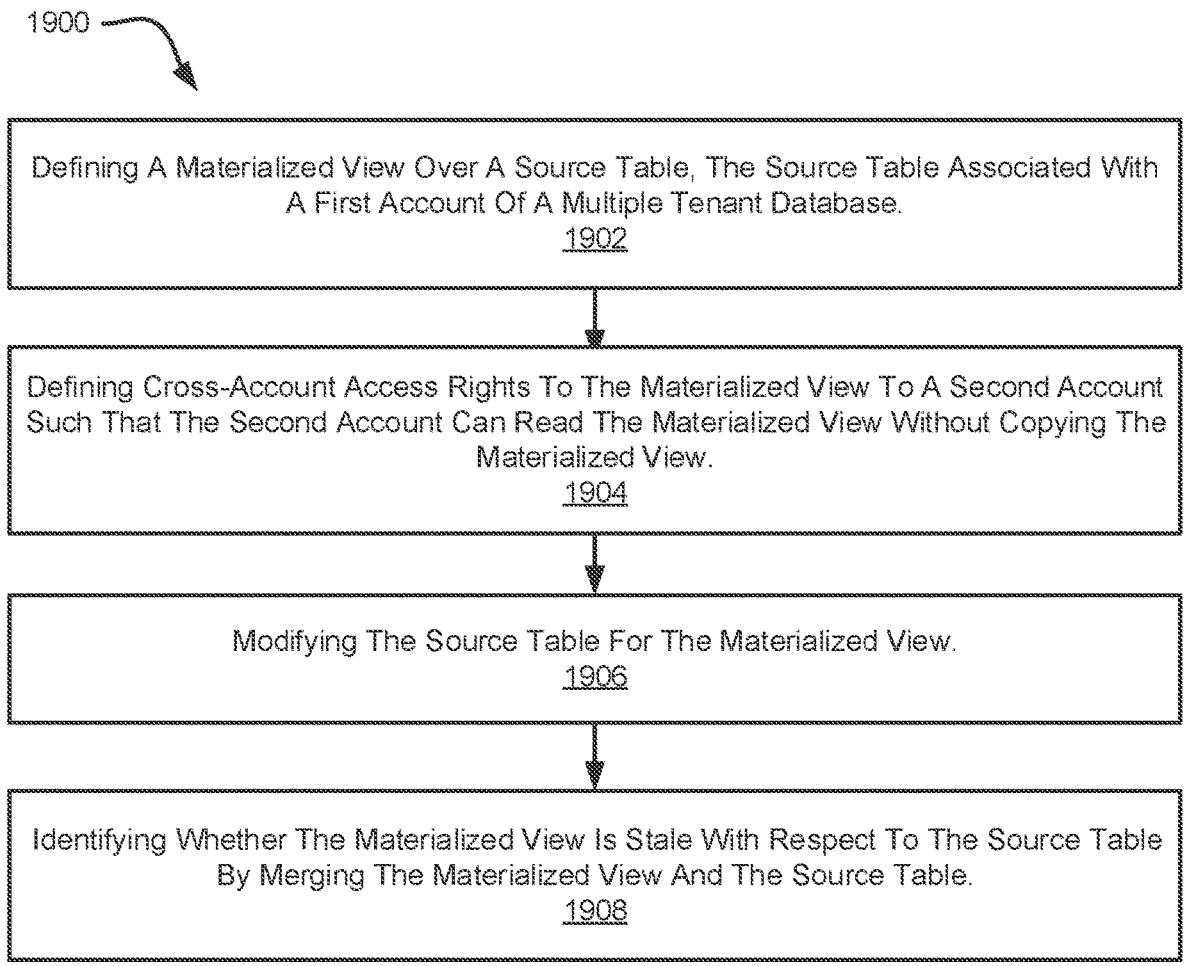
FIG. 19 is a schematic flow chart diagram of a method for cross-account sharing of a materialized view in a multiple tenant database system, according to one embodiment.

FIG. 19 is a schematic block diagram of a method 1900 for cross-account sharing of a materialized view in a multiple tenant database system. The method 1900 may be carried out by any suitable computing device such as a compute service manager 1402, a share component 210, and or a materialized view component 914. The method 1900 may be carried about by processing resources allocated to a first account and/or a second account.

The method 1900 begins and a computing resource defines at 1902 a materialized view over a source table that is associated with a first account of a multiple tenant database. The method 1900 continues and a computing resource defines at 1904 cross-account access rights to the materialized view to a second account such that the second account can read the materialized view without copying the materialized view. The method 1900 continues and a computing resource modifies at 1906 the source table for the materialized view. The method 1900 continues and a computing resource identifies at 1908 whether the materialized view is stale with respect to the source table by merging the materialized view and the source table.

Figure 20:
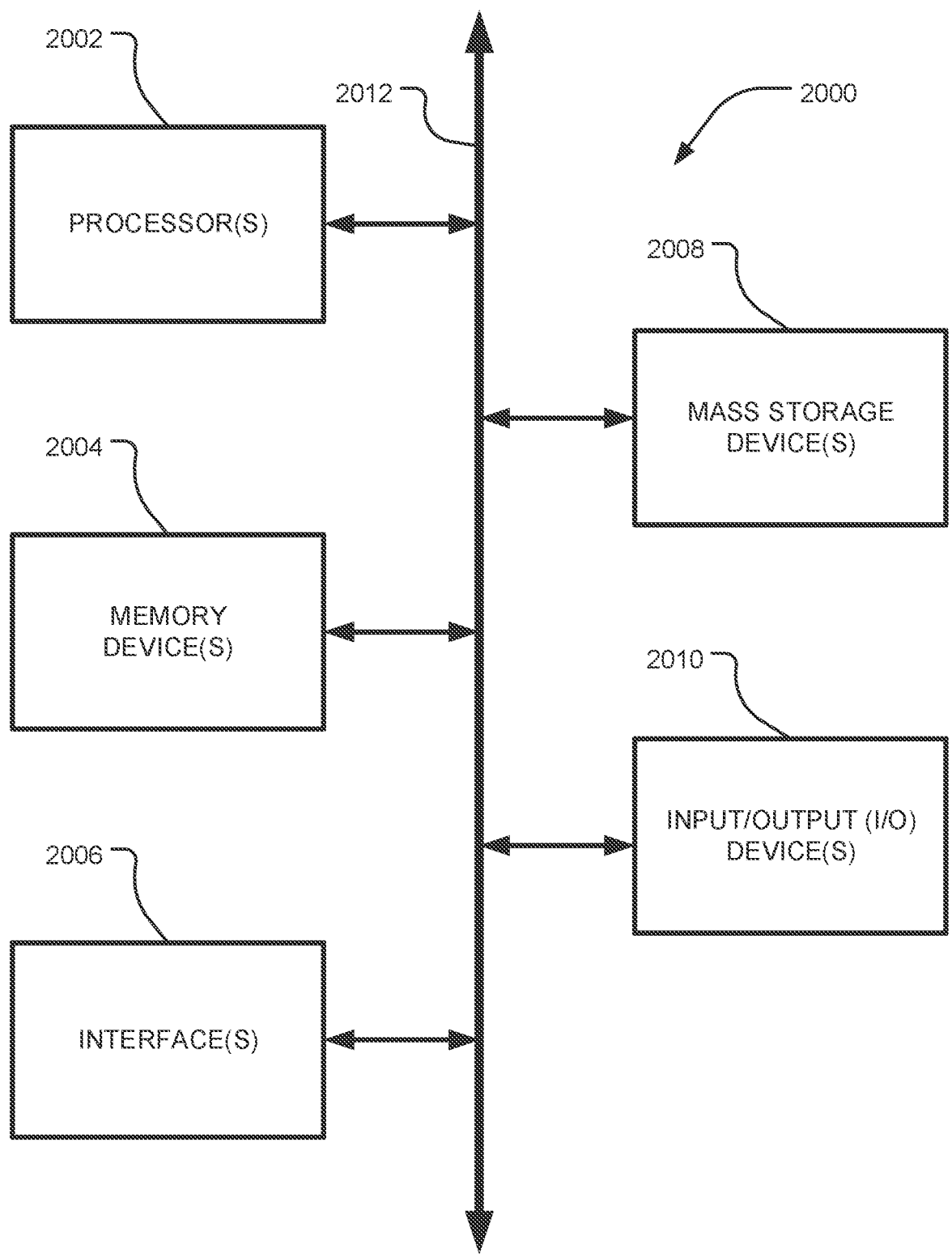
FIG. 20 is a block diagram depicting an example computing device or system consistent with one or more embodiments disclosed herein.

FIG. 20 is a block diagram depicting an example computing device 2000. In some embodiments, computing device 2000 is used to implement one or more of the systems and components discussed herein. Further, computing device 2000 may interact with any of the systems and components described herein. Accordingly, computing device 2000 may be used to perform various procedures and tasks, such as those discussed herein. Computing device 2000 can function as a server, a client or any other computing entity. Computing device 2000 can be any of a wide variety of computing devices, such as a desktop computer, a notebook computer, a server computer, a handheld computer, a tablet, and the like.

Computing device 2000 includes one or more processor(s) 2002, one or more memory device(s) 2004, one or more interface(s) 2006, one or more mass storage device(s) 2008, and one or more Input/Output (I/O) device(s) 2010, all of which are coupled to a bus 2012. Processor(s) 2002 include one or more processors or controllers that execute instructions stored in memory device(s) 2004 and/or mass storage device(s) 2008. Processor(s) 2002 may also include various types of computer-readable media, such as cache memory.

Memory device(s) 2004 include various computer-readable media, such as volatile memory (e.g., random access memory (RAM)) and/or nonvolatile memory (e.g., read-only memory (ROM)). Memory device(s) 2004 may also include rewritable ROM, such as Flash memory.

Mass storage device(s) 2008 include various computer readable media, such as magnetic tapes, magnetic disks, optical disks, solid state memory (e.g., Flash memory), and so forth. Various drives may also be included in mass storage device(s) 2008 to enable reading from and/or writing to the various computer readable media. Mass storage device(s) 2008 include removable media and/or non-removable media.

I/O device(s) 2010 include various devices that allow data and/or other information to be input to or retrieved from computing device 2000. Example I/O device(s) 2010 include cursor control devices, keyboards, keypads, microphones, monitors or other display devices, speakers, printers, network interface cards, modems, lenses, CCDs or other image capture devices, and the like.

Interface(s) 2006 include various interfaces that allow computing device 2000 to interact with other systems, devices, or computing environments. Example interface(s) 2006 include any number of different network interfaces, such as interfaces to local area networks (LANs), wide area networks (WANs), wireless networks, and the Internet.

Bus 2012 allows processor(s) 2002, memory device(s) 2004, interface(s) 2006, mass storage device(s) 2008, and I/O device(s) 2010 to communicate with one another, as well as other devices or components coupled to bus 2012. Bus 2012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2000 and are executed by processor(s) 2002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

Examples

The following examples pertain to further embodiments.

Example 1 is a system for cross-account data sharing in a multiple tenant database. The system includes means for defining a share object in a first account, the share object comprising data associated with the first account. The system includes means for granting cross-account access rights to the share object to a second account such that the second account has access to the share object without copying the share object. The system includes means for generating a materialized view over the share object. The system includes means for updating the data associated with the first account. The system includes means for identifying whether the materialized view is stale with respect to the share object by merging the materialized view and the share object.

Example 2 is a system as in Example 1, wherein the means for identifying whether the materialized view is stale with respect to the share object comprises: means for merging the materialized view and the share object; means for identifying whether data in the share object has been modified since a last refresh of the materialized view, wherein the data in the share object may be modified by one or more of an update, a delete, or an insert; and means for refreshing the materialized view with respect to the share object in response to identifying a modification to the share object since the last refresh of the materialized view.

Example 3 is a system as in any of Examples 1-2, further comprising means for querying the share object, the means for querying comprising: means for merging the materialized view and the share object; and means for executing the query based on information in the materialized view and any modifications made to the share object since a last refresh of the materialized view.

Example 4 is a system as in any of Examples 1-3, further comprising: means for storing the data associated with the first account across one or more of a plurality of shared storage devices; means for defining an execution platform associated with the first account that has read access and write access for the data associated with the first account; and means for defining an execution platform associated with the second account that has read access to the share object.

Example 5 is a system as in any of Examples 1-4, wherein: the means for generating the materialized view over the share object is incorporated in the execution platform associated with the second account; the means for updating the data associated with the first account is incorporated in the execution platform associated with the first account; and the means for identifying whether the materialized view is stale with respect to the share object is incorporated in the execution platform associated with the second account.

Example 6 is a system as in any of Examples 1-5, further comprising means for defining a secure view definition for the materialized view, the means for defining the secure view definition comprising one or more of: means for granting the second account read access and write access to the materialized view; means for granting the first account read access to the materialized view; or means for hiding the materialized view from the first account such that the first account does not have visibility into whether the materialized view was generated.

Example 7 is a system as in any of Examples 1-6, further comprising means for defining view privileges for the cross-account access rights to the share object such that an underlying detail of the share object comprises a secure view definition, wherein the underlying detail of the share object comprises one or more of: a data field in the share object; a column of data in the share object; a structural element of an underlying table of the share object; or a quantity of data in the share object.

Example 8 is a system as in any of Examples 1-7, wherein the means for defining the view privileges for the cross-account access rights to the share object comprises means for hiding the view privileges from the second account and means for makes the view privileges visible to the first account.

Example 9 is a system as in any of Examples 1-8, wherein the means for defining the share object comprises one or more of: means for defining an object name unique to the first account; means for defining an object role; or means for generating a reference list comprising a list of one or more accounts that are eligible for receiving cross-account access rights to the share object.

Example 10 is a system as in any of Examples 1-9, further comprising: means for receiving a request from the second account to generate a materialized view over certain data associated with the first account; means for identifying whether the certain data is included in the share object; means for granting the second account authorization to generate the materialized view over the certain data; and means for providing a notification to the first account indicating that the second account received authorization to generate the materialized view over the certain data.

Example 11 is a method for cross-account data sharing in a multiple tenant database. The method includes defining a share object in a first account, the share object comprising data associated with the first account. The method includes granting cross-account access rights to the share object to a second account such that the second account has access to the share object without copying the share object. The method includes generating a materialized view over the share object. The method includes updating the data associated with the first account. The method includes identifying whether the materialized view is stale with respect to the share object by merging the materialized view and the share object.

Example 12 is a method as in Example 11, wherein identifying whether the materialized view is stale with respect to the share object comprises: merging the materialized view and the share object; identifying whether data in the share object has been modified since a last refresh of the materialized view, wherein the data in the share object may be modified by one or more of an update, a delete, or an insert; and refreshing the materialized view with respect to the share object in response to identifying a modification to the share object since the last refresh of the materialized view.

Example 13 is a method as in any of Examples 11-12, further comprising querying the share object by: merging the materialized view and the share object; and executing the query based on information in the materialized view and any modifications made to the share object since a last refresh of the materialized view.

Example 14 is a method as in any of Examples 11-13, further comprising: storing the data associated with the first account across one or more of a plurality of shared storage devices; defining an execution platform associated with the first account that has read access and write access for the data associated with the first account; and defining an execution platform associated with the second account that has read access to the share object.

Example 15 is a method as in any of Examples 11-14, wherein: the generating the materialized view over the share object is processed by the execution platform associated with the second account; the updating the data associated with the first account is processed by the execution platform associated with the first account; and the identifying whether the materialized view is stale with respect to the share object is processed by the execution platform associated with the second account.

Example 16 is a processor that is configurable to execute instructions stored in non-transitory computer readable storage medium, the instructions comprising: defining a share object in a first account, the share object comprising data associated with the first account; granting cross-account access rights to the share object to a second account such that the second account has access to the share object without copying the share object; generating a materialized view over the share object; updating the data associated with the first account; and identifying whether the materialized view is stale with respect to the share object by merging the materialized view and the share object.

Example 17 is a processor as in Example 16, wherein identifying whether the materialized view is stale with respect to the share object comprises: merging the materialized view and the share object; identifying whether data in the share object has been modified since a last refresh of the materialized view, wherein the data in the share object may be modified by one or more of an update, a delete, or an insert; and refreshing the materialized view with respect to the share object in response to identifying a modification to the share object since the last refresh of the materialized view.

Example 18 is a processor as in any of Examples 16-17, wherein the instructions further comprise querying the share object by: merging the materialized view and the share object; and executing the query based on information in the materialized view and any modifications made to the share object since a last refresh of the materialized view.

Example 19 is a processor as in any of Examples 16-18, wherein the instructions further comprise defining a secure view definition for the materialized view by one or more of: granting the second account read access and write access to the materialized view; granting the first account read access to the materialized view; or hiding the materialized view from the first account such that the first account does not have visibility into whether the materialized view was generated.

Example 20 is a processor as in any of Examples 16-19, wherein the instructions further comprise defining view privileges for the cross-account access rights to the share object such that an underlying detail of the share object comprises a secure view definition, wherein the underlying detail of the share object comprises one or more of: a data field in the share object; a column of data in the share object; a structural element of an underlying table of the share object; or a quantity of data in the share object.

Example 21 is a system for cross-account sharing of a materialized view in a multiple tenant database. The system includes means for defining a materialized view over a source table, the source table associated with a first account of the multiple tenant database. The system includes means for defining cross-account access rights to the materialized view to a second account such that the second account has access to read the materialized view. The system includes means for modifying the source table for the materialized view. The system includes means for identifying whether the materialized view is stale with respect to the source table by merging the materialized view and the source table.

Example 22 is a system as in Example 21, wherein the means for defining the cross-account access rights to the materialized view further comprises means for defining the cross-account access rights such that the second account does not have access to read the source table for the materialized view or write to the source table for the materialized view.

Example 23 is a system as in any of Examples 21-22, wherein the means for identifying whether the materialized view is stale with respect to the source table comprises: means for merging the materialized view and the source table; and means for identifying whether data in the source table has been modified since a last refresh of the materialized view; wherein the system further comprises means for refreshing the materialized view with respect to the source table in response to identifying a modification to the source table since the last refresh of the materialized view.

Example 24 is a system as in any of Examples 21-23, further comprising: means for storing the source table associated with the first account across one or more of a plurality of storage devices that are shared across the multiple tenant database; means for defining an execution platform associated with the first account that has read access and write access to the source table for the materialized view; and means for defining an execution platform associated with the second account that has read access to the materialized view.

Example 25 is a system as in any of Examples 21-24, wherein: the execution platform associated with the first account includes the means for defining the materialized view; and the execution platform associated with the first account includes the means for modifying the source table for the materialized view.

Example 26 is a system as in any of Examples 21-25, further comprising means for defining view privileges for the cross-account access rights to the materialized view such that an underlying detail of the source table for the materialized view comprises a secure view definition, wherein the underlying detail of the source table comprises one or more of: a data field in the source table; a column of data in the source table; a structural element of the source table; a quantity of data in the source table; metadata for the source table; or a transaction log of modifications made to the source table.

Example 27 is a system as in any of Examples 21-26, wherein the means for defining the view privileges for the cross-account access rights to the materialized view comprises means for hiding the view privileges from the second account and means for making the view privileges visible to the first account.

Example 28 is a system as in any of Examples 21-27, further comprising means for defining a reference list comprising a list of one or more accounts that are eligible for receiving cross-account access rights to the materialized view.

Example 29 is a system as in any of Examples 21-28, further comprising: means for receiving a request from the second account to generate the materialized view over certain data stored in the source table; means for providing the request to the first account for approval or denial; and means for providing a notification to the second account indicating whether the request was approved or denied by the first account.

Example 30 is a system as in any of Examples 21-29, further comprising means for providing a notification to the second account indicating that the materialized view is stale with respect to the source table in response to identifying that the materialized view is stale with respect to the source table.

Example 31 is a method for cross-account sharing of a materialized view in a multiple tenant database. The method includes defining a materialized view over a source table, the source table associated with a first account of the multiple tenant database. The method includes defining cross-account access rights to the materialized view to a second account such that the second account has access to read the materialized view. The method includes modifying the source table for the materialized view. The method includes identifying whether the materialized view is stale with respect to the source table by merging the materialized view and the source table.

Example 32 is a method as in Example 31, wherein defining the cross-account access rights to the materialized view further comprises defining the cross-account access rights such that the second account does not have access to read the source table for the materialized view or write to the source table for the materialized view.

Example 33 is a method as in any of Examples 31-32, wherein identifying whether the materialized view is stale with respect to the source table comprises: merging the materialized view and the source table; and identifying whether data in the source table has been modified since a last refresh of the materialized view; wherein the method further comprises refreshing the materialized view with respect to the source table in response to identifying a modification to the source table since the last refresh of the materialized view.

Example 34 is a method as in any of Examples 31-33, further comprising defining view privileges for the cross-account access rights to the materialized view such that an underlying detail of the source table for the materialized view comprises a secure view definition, wherein the underlying detail of the source table comprises one or more of: a data field in the source table; a column of data in the source table; a structural element of the source table; a quantity of data in the source table; metadata for the source table; or a transaction log of modifications made to the source table.

Example 35 is a method as in any of Examples 31-34, further comprising defining a reference list comprising a list of one or more accounts that are eligible for receiving cross-account access rights to the materialized view.

Example 36 is a processor that is configurable to execute instructions stored in non-transitory computer readable storage media. The instructions include defining a materialized view over a source table, the source table associated with a first account of the multiple tenant database. The instructions include defining cross-account access rights to the materialized view to a second account such that the second account has access to read the materialized view. The instructions include modifying the source table for the materialized view. The instructions include identifying whether the materialized view is stale with respect to the source table by merging the materialized view and the source table.

Example 37 is a processor as in Example 36, wherein defining the cross-account access rights to the materialized view further comprises defining the cross-account access rights such that the second account does not have access to read the source table for the materialized view or write to the source table for the materialized view.

Example 38 is a processor as in any of Examples 36-37, wherein identifying whether the materialized view is stale with respect to the source table comprises: merging the materialized view and the source table; and identifying whether data in the source table has been modified since a last refresh of the materialized view; wherein the instructions further comprise refreshing the materialized view with respect to the source table in response to identifying a modification to the source table since the last refresh of the materialized view.

Example 39 is a processor as in any of Examples 36-38, wherein the instructions further comprise defining view privileges for the cross-account access rights to the materialized view such that an underlying detail of the source table for the materialized view comprises a secure view definition, wherein the underlying detail of the source table comprises one or more of: a data field in the source table; a column of data in the source table; a structural element of the source table; a quantity of data in the source table; metadata for the source table; or a transaction log of modifications made to the source table.

Example 40 is a processor as in any of Examples 36-39, wherein the instructions further comprise defining a reference list comprising a list of one or more accounts that are eligible for receiving cross-account access rights to the materialized view.

Example 41 is an apparatus including means to perform a method or realize an apparatus or system as in any of Examples 1-40.

Example 42 is a machine-readable storage including machine-readable instructions, when executed, to implement a method or realize an apparatus of any of Examples 1-40.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

The claimed invention is:

1. A method comprising:
storing a source table associated with a provider account, the source table including at least one micro-partition and stored across one or more of a plurality of shared storage devices in a multiple tenant database system, and wherein the at least one micro-partition is an immutable storage object;
generating, by one or more execution nodes allocated to the provider account, a materialized view from underlying data in the source table;
storing the materialized view in cache storage allocated to the provider account separate from the plurality of shared storage devices;
providing access to the materialized view to a receiver account;
updating, by the provider account, the source table including deleting at least one micro-partition based on execution of a transaction and inserting at least one new micro-partition;
receiving, from the receiver account, a query directed at the materialized view;
identifying modifications to the source table not reflected in the materialized view by executing a merge command between the source table and the materialized view;
in response to merging the source table and materialized view, scanning the source table to detect the insertion of the at least one new micro-partition in the source table but not present in the materialized view;
in response to merging the source table and materialized view, scanning the materialized view to detect the deletion of the at least one micro-partition found in the materialized view but not present in the source table;
updating the materialized view based on detecting the at least one new micro-partition and detecting the deletion of the at least one micro-partition;
executing the query based on the updated materialized view; and
providing access to the updated materialized view to the receiver account for query processing and restricting the receiver account from accessing the update to the underlying data in the source table.

2. The method of claim 1, further comprising:
creating an alias object in the receiver account for the materialized view for use by the receiver account; and
linking the alias object with a shared object in the provider account.

3. The method of claim 2, further comprising:
granting a role in the receiver account usage privileges to the alias object, and
restricting the receiver account from accessing the underlying data in the source table.

4. The method of claim 1,
wherein the provider account grants usage privileges to a role in the receiver account for accessing the materialized view.

5. The method of claim 1, wherein providing access to the materialized view to the receiver account comprises sharing the materialized view without creating a duplicate of the materialized view.

6. The method of claim 1, wherein the provider account has write access and read access to the materialized view, wherein the receiver account has read access to the materialized view.

7. A system comprising:
one or more processors of a machine; and
a memory storing instructions that, when executed by the one or more processors, cause the machine to perform operations comprising:
storing a source table associated with a provider account, the source table including at least one micro-partition and stored across one or more of a plurality of shared storage devices in a multiple tenant database system, and wherein the at least one micro-partition is an immutable storage object;
generating, by one or more execution nodes allocated to the provider account, a materialized view from underlying data in the source table;
storing the materialized view in cache storage allocated to the provider account separate from the plurality of shared storage devices;
providing access to the materialized view to a receiver account;
updating, by the provider account, the source table including deleting at least one micro-partition based on execution of a transaction and inserting at least one new micro-partition;
receiving, from the receiver account, a query directed at the materialized view;
identifying modifications to the source table not reflected in the materialized view by executing a merge command between the source table and the materialized view;
in response to merging the source table and materialized view, scanning the source table to detect the insertion of the at least one new micro-partition in the source table but not present in the materialized view;
in response to merging the source table and materialized view, scanning the materialized view to detect the deletion of the at least one micro-partition found in the materialized view but not present in the source table;
updating the materialized view based on detecting the at least one new micro-partition and detecting the deletion of the at least one micro-partition;
executing the query based on the updated materialized view; and
providing access to the updated materialized view to the receiver account for query processing and restricting the receiver account from accessing the update to the underlying data in the source table.

8. The system of claim 7, the operations further comprising:
creating an alias object in the receiver account for the materialized view for use by the receiver account; and
linking the alias object with a shared object in the provider account.

9. The system of claim 8, the operations further comprising:
granting a role in the receiver account usage privileges to the alias object, and restricting the receiver account from accessing the underlying data in the source table.

10. The system of claim 7, wherein the provider account grants usage privileges to a role in the receiver account for accessing the materialized view.

11. The system of claim 7, wherein providing access to the materialized view to the receiver account comprises sharing the materialized view without creating a duplicate of the materialized view.

12. The system of claim 7, wherein the provider account has write access and read access to the materialized view, wherein the receiver account has read access to the materialized view.

13. A non-transitory computer readable storage media storing instructions that, when executed by one or more processors, cause the one or more processors to:
   store a source table associated with a provider account, the source table including at least one micro-partition and stored across one or more of a plurality of shared storage devices in a multiple tenant database system, and wherein the at least one micro-partition is an immutable storage object;
   generate, by one or more execution nodes allocated to the provider account, a materialized view from underlying data in the source table;
   store the materialized view in cache storage allocated to the provider account separate from the plurality of shared storage devices;
   provide access to the materialized view to a receiver account;
   update, by the provider account, the source table including deleting at least one micro-partition based on execution of a transaction and inserting at least one new micro-partition;
   receive, from the receiver account, a query directed at the materialized view;
   identify modifications to the source table not reflected in the materialized view by executing a merge command between the source table and the materialized view;
   in response to merging the source table and materialized view, scan the source table to detect the insertion of the at least one new micro-partition in the source table but not present in the materialized view;
   in response to merging the source table and materialized view, scan the materialized view to detect the deletion of the at least one micro-partition found in the materialized view but not present in the source table;
   update the materialized view based on detecting the at least one new micro-partition and detecting the deletion of the at least one micro-partition;
   execute the query based on the updated materialized view; and
   provide access to the updated materialized view to the receiver account for query processing and restricting the receiver account from accessing the update to the underlying data in the source table.

14. The non-transitory computer readable storage media of claim 13, further comprising:
   creating an alias object in the receiver account for the materialized view for use by the receiver account; and
   linking the alias object with a shared object in the provider account.

15. The non-transitory computer readable storage media of claim 14, further comprising:
   granting a role in the receiver account usage privileges to the alias object, and
   restricting the receiver account from accessing the underlying data in the source table.

16. The non-transitory computer readable storage media of claim 13, wherein the provider account grants usage privileges to a role in the receiver account for accessing the materialized view.

17. The non-transitory computer readable storage media of claim 13, wherein providing access to the materialized view to the receiver account comprises sharing the materialized view without creating a duplicate of the materialized view.

18. The non-transitory computer readable storage media of claim 13, wherein the provider account has write access and read access to the materialized view, wherein the receiver account has read access to the materialized view.

* * * * *